(12) United States Patent
Jiang

(10) Patent No.: US 8,121,594 B2
(45) Date of Patent: Feb. 21, 2012

(54) METHOD AND SYSTEM FOR PROVIDING ROAMING SERVICES TO INBOUND ROAMERS USING VISITED NETWORK GATEWAY LOCATION REGISTER

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 964 days.

(21) Appl. No.: 11/979,537

(22) Filed: Nov. 5, 2007

(65) Prior Publication Data

US 2008/0125116 A1 May 29, 2008

Related U.S. Application Data

(63) Continuation-in-part of application No. 11/819,164, filed on Jun. 25, 2007, and a continuation-in-part of application No. 11/402,128, filed on Apr. 12, 2006, and a continuation-in-part of application No. 11/374,437, filed on Mar. 14, 2006, and a continuation-in-part of application No. 11/529,552, filed on Sep. 29, 2006, and a continuation-in-part of application No. 10/918,645, filed on Aug. 13, 2004, and a continuation-in-part of application No. 10/782,681, filed on Feb. 18, 2004, and a continuation-in-part of application No. 11/429,448, filed on May 8, 2006, and a continuation-in-part of application No. 11/366,021, filed on Mar. 2, 2006.

(60) Provisional application No. 60/856,301, filed on Nov. 3, 2006, provisional application No. 60/906,234, filed on Mar. 12, 2007, provisional application No. 60/905,586, filed on Mar. 8, 2007, provisional application No. 60/900,134, filed on Feb. 8, 2007, provisional application No. 60/833,779, filed on Jul. 28, 2006.

(51) Int. Cl.
*H04W 4/00* (2009.01)

(52) U.S. Cl. ............... 455/432.1; 455/422.1; 455/432.2; 455/433; 455/435.1; 455/435.2; 455/436; 455/464; 370/310; 370/310.2; 370/325; 370/331

(58) Field of Classification Search ............... 455/422.1, 455/432.1, 432.3, 433, 435.1, 436–445, 464, 455/435.2; 370/310, 310.2, 328, 331–334
See application file for complete search history.

(56) References Cited

U.S. PATENT DOCUMENTS 5,353,328 A 10/1994 Jokimies
(Continued)

FOREIGN PATENT DOCUMENTS

CA 2281041 A1 2/2001
(Continued)

OTHER PUBLICATIONS

ETSI TS 123 119 (V6.0.0) Dec. 2004, pp. 1-129.*
(Continued)

*Primary Examiner* — Steve D Agosta
(74) *Attorney, Agent, or Firm* — Arent Fox LLP

(57) ABSTRACT

The present invention provides a method for providing roaming services to one or more subscribers, correspondingly associated with the one or more HPMNs, while the one or more subscribers are registered with the VPMN. The method includes allocating a pool of GTs to a Gateway Location Register (GLR) that is associated with the VPMN, where the pool of Global Titles (GTs) corresponds to at least one of: one or more VLRs associated with the VPMN, one or more SGSNs associated with the VPMN, one or more HPMNs, and one or more HLRs associated with an HPMN from the one or more HPMNs. The method further includes facilitating mobile communication of the one or more subscribers in the VPMN using the allocated pool of GTs.

10 Claims, 11 Drawing Sheets

U.S. PATENT DOCUMENTS

| | | | |
|---|---|---|---|
| 5,586,166 | A | 12/1996 | Turban |
| 5,742,910 | A | 4/1998 | Gallant et al. |
| 5,764,730 | A | 6/1998 | Rabe et al. |
| 5,818,824 | A | 10/1998 | Lu et al. |
| 5,854,982 | A | 12/1998 | Chambers et al. |
| 5,901,359 | A | 5/1999 | Malmstrom |
| 5,903,832 | A | 5/1999 | Seppanen et al. |
| 5,930,701 | A | 7/1999 | Skog |
| 5,940,490 | A | 8/1999 | Foster et al. |
| 5,943,620 | A | 8/1999 | Boltz et al. |
| 5,953,653 | A | 9/1999 | Josenhans et al. |
| 5,987,318 | A | 11/1999 | Alperovich et al. |
| 5,987,323 | A | 11/1999 | Huotori |
| 5,987,325 | A | 11/1999 | Tayloe |
| 6,014,561 | A | 1/2000 | Mölne |
| 6,052,604 | A | 4/2000 | Bishop et al. |
| 6,058,309 | A | 5/2000 | Huang et al. |
| 6,075,855 | A | 6/2000 | Christiansen et al. |
| 6,085,084 | A | 7/2000 | Christmas |
| 6,138,005 | A | 10/2000 | Park |
| 6,138,009 | A | 10/2000 | Birgerson |
| 6,148,197 | A | 11/2000 | Bridges et al. |
| 6,163,701 | A | 12/2000 | Saleh et al. |
| 6,185,295 | B1 | 2/2001 | Frederiksen et al. |
| 6,185,436 | B1 | 2/2001 | Vu |
| 6,192,255 | B1 | 2/2001 | Lewis et al. |
| 6,195,532 | B1 | 2/2001 | Bamburak et al. |
| 6,208,864 | B1 | 3/2001 | Agrawal et al. |
| 6,212,372 | B1 | 4/2001 | Julin |
| 6,327,267 | B1 * | 12/2001 | Valentine et al. ............ 370/466 |
| 6,356,755 | B1 | 3/2002 | Valentine et al. |
| 6,356,756 | B1 | 3/2002 | Koster |
| 6,456,845 | B1 | 9/2002 | Drum et al. |
| 6,456,859 | B1 | 9/2002 | Desblancs et al. |
| 6,463,298 | B1 | 10/2002 | Sorenson et al. |
| 6,466,786 | B1 | 10/2002 | Wallenius |
| 6,505,050 | B1 | 1/2003 | Brudos et al. |
| 6,515,974 | B1 | 2/2003 | Inoue et al. |
| 6,574,481 | B1 | 6/2003 | Rathnasapathy et al. |
| 6,594,258 | B1 * | 7/2003 | Larson et al. ............... 370/353 |
| 6,603,761 | B1 | 8/2003 | Wang et al. |
| 6,603,968 | B2 | 8/2003 | Anvekar et al. |
| 6,611,516 | B1 | 8/2003 | Pirkola et al. |
| 6,628,934 | B2 | 9/2003 | Rosenberg et al. |
| 6,636,502 | B1 | 10/2003 | Lager et al. |
| 6,671,523 | B1 | 12/2003 | Niepel et al. |
| 6,684,073 | B1 | 1/2004 | Stadelmann et al. |
| 6,693,586 | B1 | 2/2004 | Walters et al. |
| 6,738,622 | B1 | 5/2004 | Heutschi et al. |
| 6,738,636 | B2 | 5/2004 | Lielbridis |
| 6,764,003 | B1 | 7/2004 | Lauper et al. |
| 6,782,264 | B2 | 8/2004 | Anderson |
| 6,795,444 | B1 | 9/2004 | Vo et al. |
| 6,856,818 | B1 | 2/2005 | Ford |
| 6,876,860 | B1 | 4/2005 | Berg et al. |
| 6,920,487 | B2 | 7/2005 | Sofer et al. |
| 6,925,299 | B1 | 8/2005 | Sofer et al. |
| 6,961,559 | B1 | 11/2005 | Chow et al. |
| 6,963,543 | B2 | 11/2005 | Diep et al. |
| 6,968,383 | B1 | 11/2005 | Heutschi et al. |
| 6,975,852 | B1 | 12/2005 | Sofer et al. |
| 6,978,156 | B1 | 12/2005 | Papadopoulos et al. |
| 7,020,479 | B2 | 3/2006 | Martschitsch |
| 7,139,570 | B2 | 11/2006 | Elkarat et al. |
| 7,184,764 | B2 | 2/2007 | Raviv et al. |
| 7,231,431 | B2 | 6/2007 | Sofer et al. |
| 2002/0009199 | A1 | 1/2002 | Ala-Laurila et al. |
| 2002/0012351 | A1 | 1/2002 | Sofer et al. |
| 2002/0037708 | A1 | 3/2002 | McCann et al. |
| 2002/0087631 | A1 | 7/2002 | Sharma |
| 2002/0101858 | A1 | 8/2002 | Stuart et al. |
| 2002/0101859 | A1 | 8/2002 | Maclean |
| 2002/0160763 | A1 | 10/2002 | Mittal et al. |
| 2002/0187780 | A1 | 12/2002 | Souissi |
| 2002/0191575 | A1 | 12/2002 | Kalavade et al. |
| 2002/0196775 | A1 | 12/2002 | Tuohino et al. |
| 2003/0017843 | A1 | 1/2003 | Noblins |
| 2003/0050047 | A1 | 3/2003 | Ala-Luukko |
| 2003/0051041 | A1 | 3/2003 | Kalavade et al. |
| 2003/0064723 | A1 | 4/2003 | Thakker |
| 2003/0069922 | A1 | 4/2003 | Arunachalam |
| 2003/0129991 | A1 | 7/2003 | Allison et al. |
| 2003/0133421 | A1 | 7/2003 | Sundar et al. |
| 2003/0139180 | A1 | 7/2003 | McIntosh et al. |
| 2003/0208560 | A1 | 11/2003 | Inoue |
| 2003/0224795 | A1 | 12/2003 | Wilhoite et al. |
| 2003/0229791 | A1 | 12/2003 | De Jong |
| 2004/0019539 | A1 | 1/2004 | Raman et al. |
| 2004/0053610 | A1 | 3/2004 | Kim |
| 2004/0082346 | A1 | 4/2004 | Skytt et al. |
| 2004/0087305 | A1 | 5/2004 | Jiang |
| 2004/0120552 | A1 | 6/2004 | Borngraber et al. |
| 2004/0131023 | A1 | 7/2004 | Auterinen |
| 2004/0132449 | A1 | 7/2004 | Kowarch |
| 2004/0148400 | A1 | 7/2004 | Mostafa |
| 2004/0196858 | A1 | 10/2004 | Tsai et al. |
| 2004/0224680 | A1 | 11/2004 | Jiang |
| 2004/0229601 | A1 | 11/2004 | Zabawskyj et al. |
| 2004/0236836 | A1 | 11/2004 | Appleman |
| 2005/0013290 | A1 * | 1/2005 | Allison et al. ............... 370/352 |
| 2005/0021834 | A1 | 1/2005 | Coulombe |
| 2005/0047378 | A1 | 3/2005 | Wuschke et al. |
| 2005/0064883 | A1 | 3/2005 | Heck et al. |
| 2005/0070278 | A1 | 3/2005 | Jiang |
| 2005/0186939 | A1 | 8/2005 | Barnea et al. |
| 2005/0186960 | A1 | 8/2005 | Jiang |
| 2005/0186979 | A1 | 8/2005 | McCann et al. |
| 2005/0192007 | A1 | 9/2005 | Kumar et al. |
| 2005/0192035 | A1 | 9/2005 | Jiang |
| 2005/0215250 | A1 | 9/2005 | Chava et al. |
| 2005/0232282 | A1 | 10/2005 | Silver et al. |
| 2005/0250493 | A1 | 11/2005 | Elkarat et al. |
| 2006/0003775 | A1 | 1/2006 | Bull et al. |
| 2006/0009204 | A1 | 1/2006 | Ophir |
| 2006/0025129 | A1 | 2/2006 | Wolfman et al. |
| 2006/0052113 | A1 | 3/2006 | Ophir et al. |
| 2006/0068778 | A1 | 3/2006 | Della-Torre |
| 2006/0068786 | A1 | 3/2006 | Florence |
| 2006/0079225 | A1 | 4/2006 | Wolfman et al. |
| 2006/0079236 | A1 | 4/2006 | Del Pino et al. |
| 2006/0148459 | A1 | 7/2006 | Wolfman et al. |
| 2006/0205404 | A1 | 9/2006 | Gonen et al. |
| 2006/0211420 | A1 | 9/2006 | Ophir et al. |
| 2007/0021118 | A1 | 1/2007 | Ophir et al. |
| 2007/0049269 | A1 | 3/2007 | Ophir et al. |
| 2007/0054665 | A1 | 3/2007 | Elkarat et al. |
| 2007/0072587 | A1 | 3/2007 | Della-Torre et al. |
| 2007/0178885 | A1 | 8/2007 | Lev et al. |
| 2007/0232300 | A1 | 10/2007 | Wolfman |
| 2007/0259663 | A1 | 11/2007 | Weintraub et al. |
| 2008/0020760 | A1 | 1/2008 | Elkarat et al. |

FOREIGN PATENT DOCUMENTS

| | | |
|---|---|---|
| EP | 0899 974 A2 | 3/1999 |
| GB | 2322998 | 9/1998 |
| WO | WO 98/26621 A2 | 6/1998 |
| WO | WO 98/26626 A2 | 6/1998 |
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO2004/075598 | 9/2004 |
| WO | WO 2004/081802 | 9/2004 |
| WO | WO2005/101857 | 10/2005 |
| WO | WO2008/012815 | 1/2008 |

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).
"Digital Cellular Telecommunications system (Phase 2+); Universal Mobile Telecommunications system (UMTS); General Packet Radio Service (GPRS) Service description; Stage 2 (3GPP TS 29.060 Version 5.4.0 Release 5)" ETSI TS 123 060 V5.4.0, Dec. 2002, pp. 1-207 (XP-014007573).
"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002, pp. 1-102 (XP-002298277).
Ala-Laurila, et al., "Wireless LAN Access Network Architecture for Mobile Operators," IEEE Communications Magazine, Nov. 2001, pp. 82-89 (XP-001107810).
Brunen, M. "Roaming im Zugangsnetz Mit OWLAN uberall zu Hause sein,"Net-Zeitschrift Fuer Kommunikationsmangement, Huthig Verlag, Heilderberg, 2002, pp. 39-42 (XP-001122438).
GSM Association Permanent Reference Document: IR.33, PRD IR.33 "GPRS Roaming Guidelines," version 3.2.0, Apr. 3, 2003, pp. 1-20 (XP-002298278).
Ostrowski, F., "Roaming und Handover zwischen UMTS und Funk-LAN," NTZ (Nachrichtentechnische zeitschrift), 2002, pp. 24-26 (XP-001132263).
Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).
"Universal Mobile Telecommunications system (UMTS) NAS Functions Related to Mobile Station MS in Idle Mode" ETSI TS 123 122 V3.1.0, Jan. 2000, pp. 1-33 Document: IR.34.
"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.
Salman A. Baset et al., "An analysis of the Skype Peer-to-Peer Internet Telephony Protocol", Department of Computer Science, Sep. 15, 2004, 12 pages.
Salkintzis, et al., "WLAN-GPRS Integration for Next-Generation Mobile Data Networks," IEEE Wireless Communications, Oct. 2002, pp. 112-123 (XP-001132263).
Michael Mouly, "The GSM System for Mobile Communications", pp. 103-104. Cell and Sys, 1992.
GSM 378 on CAMEL Digital Cellular telecommunications system (Phase 2+);Customized Applications for Mobile network Enhanced Logic (CAMEL) Phase 2; Stage 2 (101 441 GSM 03.78 version 6.7.0 Release 1997).
GSM 978 on CAMEL Application protocol Digital cellular telecommunications system (Phase 2+); Customized Applications for Mobile network Enhanced Logic (CAMEL); CAMEL Application Part (CAP) specification (101 046 GSM 09.78 version 7.1.0 Release 1998).
GSM 902 on MAP Specification Digital Cellular Telecommunications (Phase 2+); Mobile Application Part (MAP) Specification (100 974 3GPP TS 09.02 version 7.9.0 Release 1998).
Q 761 (Functional description of the ISDN User Part of CCITT Signaling System No. 7) (May 1998).
Q 762 (General Functions of CCITT Signaling System No. 7 ISDN User Part Messages and parameters). 1999.
Q 763 (Formats and codes of CCITT Signaling System No. 7 ISDN User Part Message and parameters). 1999.
Q 764 (1999), Signaling System No. 7—ISDN User Part signaling procedures.
Q 730 (1999), ISDN User Part supplementary services.
Q 711 (1996), Functional description of signaling connection control part.
Q 712 (1996), Definition and function of signaling connection control part messages.
Q 713 (1996), Signaling connection control part formats and codes.
Q 714 (1996), Signal connection control part procedures.
Q 716 (1993), Signaling Connection Control Part (SCCP) performance.

GSM 340 on SMS Digital cellular telecommunications system (Phase 2+); Technical realization of the Short Message Service (SMS); (GSM 03.40 version 7.4.0 Release 1998).
SMPP Forum: SMPP Protocol Document Version:—Oct. 12, 1999 Issue 1.2.
Universal Mobile Telecommunications System (UMTS); Multimedia Messaging Service (MMS), Functional description; Stage 2 (3GPP TS 23.140 version 4.2.0 Release 4).
Technical Specification $3^{rd}$ Generation Partnership Project; Technical Specification Group Services and System Aspects; Service accessibility (Release 1999).
Q1214, ITU-T Intelligent Network Distributed Functional Plane for Intelligent Network CS-1. 1995.
Q1215, ITU-T Physical Plane for Intelligent Network CS-1. 1995.
Q1218 ITU-T Interface Recommendation for Intelligent Network CS-1. 1995.
GMS 408 on radio interface layer 3; Digital cellular telecommunications system (Phase 2+); Mobile radio interface layer 3 specification (GSM 04.08 version 7.4.2 Release 1998).
GSM 322 network selection Digital cellular telecommunications system (Phase 2+); functions related to Mobile Station (MS) in idle mode and group receive mode (GSM 03.22 version 8.3.0 Release 1999).
GSM 23122 network selection 3GPP TS 23.122 V3.9.0 (Dec. 2002) Technical Specification; $3^{rd}$ Generation Partnership Project; Technical Specification Group Core Network; NAS Functions related to Mobile Station (MS) in idle mode (release 1999).
GSM 22011 $3^{rd}$ Generation Partnership Project; Technical Specification Group Services and System Aspects; Service Accessibility (version 3.0.1); 3 GPP TS 22.011 V3.8.0 (Sep. 2002) Technical Specification; $3^{rd}$ Generation Partnership Project; Technical Specification Group Services and System Aspects; Service accessibility (Release 1999).
3 GPP 29010; 3 GPP TS 29.010 V3.10.0 (Dec. 2002); Technical Specification; $3^{rd}$ Generation Partnership Project; Technical Specification Group Core Network; Information element mapping between Mobile Station-Base Station System (MS-BSS) and Base Station System-Mobile-services Switching Centre (BSS-MSC).
GSM 318 on CAMEL Basic Call Handling; Digital cellular telecommunications system (Phase 2+) Basic call handling; Technical realization (GSM 03.18 version 6.6.0 Release 1997).
ITU-T Recommendation Q. 766 (1993), Specifications of Signalling System No. 7—ISDN User Part—Performance objectives in the integrated services digital network application.
ITU-T Recommendation Q. 765 (1998), Signaling system No. 7—Application transport mechanism.
ITU-T Recommendation Q. 769.1 (1999), Signaling system No. 7—ISDN user part enhancements for the support of Number Portability.
ITU-T Q.771 Series Q: Switching and Signalling—Specifications of Signalling System No. 7—Transaction capabilities application part. Functional description of transaction capabilities (Jun. 1997).
ITU-T Q.772 Series Q: Switching and Signalling—Specifications of Signalling System No. 7—Transaction capabilities application part. Transaction capabilities information element definitions (Jun. 1997).
ITU-T Q.773 Series Q: Switching and Signalling—Specifications of Signalling System No. 7—Transaction capabilities application part. Transaction capabilities formats and encoding (Jun. 1997).
ITU-T Q.774 Series Q: Switching and Signalling—Specifications of Signalling System No. 7—Transaction capabilities application part. Transaction capabilities procedures. (Jun. 1997).
ITU-T Q.775 Series Q: Switching and Signalling—Specifications of Signalling System No. 7—Transaction capabilities application part. Guidelines for using transaction capabilities. (Jun. 1997).
GSM 11.11 Digital Cellular Telecommunications System (Phase 2+); Specification of the Subscriber Identity Module-Mobile Equipment (SIM-ME) Interface. Dec. 1995, version 5.0.0.
IR 7320 Steering of Roaming Implementation Guidelines 0.1. May 13, 2005.
GSM 253.04 $3^{rd}$ Generation Partnership Project; Technical Specification Group Radio Access Network; UE Procedures in Idle Mode (3G TS 25.304 version 3.0.0) 1999.

GSM 29002 MAP Protocol (Technical Specification Group Core Network; Mobile Application Part Specifications [MAP]; Release 4). 2002.

3G TS 22.078 version 3.2.0 Release 1999 3$^{rd}$ Generation Partnership Project; Technical Specification Group Services and System Aspects; Customized Applications for Mobile Network Enhanced Logic (CAMEL); Service description, Stage 1.

3G TS 23.278 version 6.0.0. Release 6 3$^{rd}$ Generation Partnership Project; Technical Specification Group Core Network; Customized Applications for Mobile Network Enhanced Logic (CAMEL) Phase 4-Stage 2; IM CN Interworking. 2004.

GSM 23060 3$^{rd}$ Generation Partnership Project; Technical Specification Group Services and System Aspects; General Packet Radio Service (GPRS); Service description; Stage 2 (Release 5). 2002.

GSM 29060 3$^{rd}$ Generation Partnership Project; Technical Specification Group Core Network; General Packet Radio Service (GPRS); GPRS Tunneling Protocol (GTP) across the Gn and Gp interface (release 1999).

GSM 23.012 3$^{rd}$ Generation Partnership Project; Technical Specification Group Core Network; Location Management Procedures (Release 4) 2001.

Q701, Specifications of Signalling System No. 7—Functional Description of the Message Transfer Part (MTP) of Signalling System No. 7. 1993.

Q702 ITU-T Specifications of Signalling System No. 7, Signalling Data Link. 1993.

Q703 ITU-T Specifications of Signalling System No. 7—Message Transfer Part. Signalling link. 1996.

Q704, Signalling network functions and messages. Specifications of Signalling System No. 7—Message Transfer Part. (Jul. 1996).

ARIB STD-T63-31.048 V5.1.0 Security Mechanisms for the (U)SIM Application Toolkit, Test Specification (Release 5) 2005.

GSM ETSI TS 129.013 v3.0..0 Digital Cellular Telecommunications System (Phase 2+) (GSM); Universal Mobile Telecommunications System (UTMS); Signalling interworking between ISDN Supplementary Services; Application Service Element (ASE) and Mobile Application Part (MAP) protocols (3G TS 29.013 release 1999).

Brunen, M. "Roaming im Zugangsnetz Mit OWLAN uberall zu Hause sein, "Net-Zeitschrift Fuer Kommunikationsmangement, Huthiq Verlag, Heilderberq, 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LAN," NTZ (Nachrichtentechnische zeitschrift), 2002, pp. 24-26 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal Mobile Telecommunications system (UMTS) NAS Functions Related to Mobile Station Ms in Idle Mode" ETSI TS 123 122 V3.1.0, Jan. 2000, pp. 1-33 Document: IR.34.

"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.

Salman A. Baset et al., "An analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992.

GSM 378 on CAMEL Digital Cellular telecommunications system (Phase 2+);Customized Applications for Mobile network Enhanced Logic (CAMEL) Phase 2; Stage 2 (101 441 GSM 03.78 version 6.7.0 Release 1997).

GSM 978 on CAMEL Application protocol Digital cellular telecommunications system (Phase 2+); Customized Applications for Mobile network Enhanced Logic (CAMEL); CAMEL Application Part (CAP) specification (101 046 GSM 09.78 version 7.1.0 Release 1998).

GSM 902 on MAP Specification Digital Cellular Telecommunications (Phase 2+); Mobile Application Part (MAP) Specification (100 974 3GPP TS 09.02 version 7.9.0 Release 1998).

Q 761 (Functional description of the ISDN User Part of CCITT Signaling System No. 7) (May 1998).

Q 762 (General Functions of CCITT Signaling System No. 7 ISDN User Part Messages and parameters). 1999.

0 763 (Formats and codes of CCITT Signaling System No. 7 ISDN User Part Message and parameters). 1999.

Q 764 (1999), Signaling System No. 7—ISDN User Part signaling procedures.

Q 730 (1999), ISDN User Part supplementary services.

0 711 (1996), Functional description of signaling connection control part.

Q 712 (1996), Definition and function of signaling connection control part messages.

Q 713 (1996), Signaling connection control part formats and codes.

Q 714 (1996), Signal connection control part procedures.

Q 716 (1993), Signaling Connection Control Part (SCCP) performance.

GSM 340 on SMS Digital cellular telecommunications system (Phase 2+); Technical realization of the Short Message Service (SMS); (GSM 03.40 version 7.4.0 Release 1998).

SMPP Forum: SMPP Protocol Document Version:—Oct. 12, 1999 Issue 1.2.

Technical Specification3$^{rd}$ Generation Partnership Project; Technical Specification Group Services and System Aspects; Service accessibility (Release 1999).

Q1214, ITU-T Intelligent Network Distributed Functional Plane for Intelligent Network CS-1. 1995.

Q1215, ITU-T Physical Plane for Intelligent Network CS-1. 1995.

Q1218 ITU-T Interface. Recommendation for Intelligent Network CS-1. 1995.

GSM 23.119 3$^{rd}$ Generation Partnership Project; Technical Specification Group Core Network; Gateway Location Register (GLR)—Stage 2 (3G TS 23.119 version 0.3.0). 1999. 158 pgs.

GSM 29.120 MAP specification for GLR May 2011, 158 pgs.

GSM 03.20 Security related network functions 2-1992, 48 pgs.

GSM 03.60 on GPRS Sep. 2002, 112 pgs.

GSM 09.60 on GPRS GTP 0 , Dec. 2002, 69 pgs.

GSM 03.79 on CAMEL Support of Optimal Routing (SOR) Jun. 2000, 41 pgs.

* cited by examiner

METHOD AND SYSTEM FOR PROVIDING ROAMING SERVICES TO INBOUND ROAMERS USING VISITED NETWORK GATEWAY LOCATION REGISTER

RELATED APPLICATIONS

This application claims the benefit of U.S. Provisional Patent Application No. 60/856,301 titled "Smart Gateway Location Register" filed on Nov. 3, 2006, and of from U.S. Provisional Patent Application No. 60/906,234 with the same title, filed on Mar. 12, 2007, and of U.S. Provisional Patent Application No. 60/905,586 with same title, filed on Mar. 8, 2007, and of U.S. Provisional Patent Application No. 60/900,134 with same title, filed on Feb. 8, 2007. This application is a continuation-in-part of U.S. patent application Ser. No. 11/819,164 titled "A Network Based Framework for Retaining Inbound Roamers—Inbound Traffic Redirection Based on HLR Errors or VLR Errors" filed on Jun. 25, 2007, and of U.S. patent application Ser. No. 11/402,128 titled "Method and Apparatus for Redirection of Inbound Roamer Traffic" filed on Apr. 12, 2006, and of U.S. patent application Ser. No. 11/374,437 titled "Method and Apparatus for Defense Against Network Traffic Redirection" filed on Mar. 14, 2006, and of U.S. patent application Ser. No. 11/529,552 titled "Anti-Inbound Traffic Redirection and Defense Against Inbound Traffic Redirection" filed on Sep. 29, 2006, and of U.S. patent application Ser. No. 10/918,645 titled "Signaling Gateway with Multiple IMSI with Multiple MSISDN (MIMM) Service in a Single SIM for Multiple Roaming Partners" filed on Aug. 13, 2004, and U.S. patent application Ser. No. 10/782,681 titled "Providing Multiple MSISDN Numbers in a Mobile Device with a Single IMSI" filed on Feb. 18, 2004, and of U.S. patent application Ser. No. 11/429,448 titled "Dynamic Generation of CSI for Inbound Roamers" filed on May 8, 2006, and of U.S. patent application Ser. No. 11/366,021 titled "Dynamic Camel Approach for Implementing Call Control Services for Inbound Roamers" filed on Mar. 2, 2006. All of the aforementioned related patent applications are incorporated herein in their entirety by this reference.

FIELD OF THE INVENTION

The present invention generally relates to mobile communication of roamers. More specifically, the present invention relates to facilitating mobile communication for inbound roamers in a visited network using a Gateway Location Register (GLR).

BACKGROUND OF THE INVENTION

In the wireless communication industry, there is rising competition among various network operators to increase their roaming revenues. To enhance roaming revenues, the network operators commonly offer various "Value Added Services" (VASs) to their roamers in order to provide a better, easier telephone mobile communications experience to visitors or travelers, to encourage increased mobile phone use, and to spread the use of roaming to more users.

Some of these VASs can be provided to inbound roamers (who are subscribers of a home network and roaming in a visited network) using enhanced applications, such as, but not limited to, providing the inbound roamers with a visited network Mobile Station International Subscriber Directory Number (MSISDN) to make calls at local rates in the visited network, allowing the inbound roamers having a dual International Mobile Subscriber Identity (IMSI) Subscriber Identity Module (SIM) in the visited network to make calls at local rates, removing a call barring parameter to enable inbound roamers' mobile communication, and restoring mobile communication of the inbound roamer when his handset gets stuck in the visited network.

In order to provide these VASs to the inbound roamers, the visited network operators need a central location (or a central node) to deploy and operate these enhanced applications, while complying with international standards set forth by Global System for Mobile communication Association (GSMA) for inter-operator communication. Many visited network operators add new signaling node(s) or configure their existing signaling nodes in their networks. In an exemplary case, the visited network operator may deploy a Gateway Location Register (GLR) as a signaling node to optimize the registration process (i.e. Location Update (LUP) process). This prior art GLR is positioned between the visited network's Visited Location Register (VLR)/Serving General Packet Radio System Support Node (SGSN) and the home network's Home Location Register (HLR).

The prior art GLR is only able to cache subscriber profile information of its inbound roamers during their first LUP attempt at the visited network's VLR. Using the cached profile information, the prior art GLR responds to subsequent LUP attempts by these inbound roamers at the visited network's VLR by acting as a pseudo-HLR to these inbound roamers.

Since inbound roamers' LUP process is handled within the visited network, GLR's originally were proposed to reduce the inter-network signalling overhead caused due to the LUP process. However the cost associated with signaling has reduced significantly, thereby making the prior art GLR deployment of reduced benefit to these visited network operators. Moreover, even state-of-the-art GLRs do not assist the visited network operator in providing any VASs to inbound roamers, and is limited just to caching of subscriber profile information during LUP process.

Specifically, typical GLRs in the art us a single Global Title (GT) of the visited network while communicating with various elements in the home network. The GT is a unique address that is used to differentiate network elements within a network topology. A prior art GLR's GT typically presents an address of a VLR in the visited network when interacting with an HLR in the home network, and an address of an HLR in the home network when interacting with a VLR in the visited network. In this single GT approach, the GLR always uses the same GT to interact with all VLRs in the visited network and all HLRs in the home network. Since the prior art GLR represents all VLRs by the single GT while interacting with network elements in the home network, the prior art GLR is unable to emulate individual network elements in the visited network. This does not support a visited network operator in its purpose of providing VASs to its inbound roamers.

Moreover, due to this single GT, a home network application is unable to cache correct capabilities of the visited network's VLR. Furthermore, due to the use of single GT, the prior art GLR is unable to provide redundancy in case the GLR fails. This is because a signaling node in the visited network (such as a Signaling Transfer Point (STP)) is unable to route Signaling Connection Control Part (SCCP) messages of inbound roamers, originating from the home network and destined for a particular VLR in the visited network, to the destined VLR since there is no possibility of maintaining a routing at the STP corresponding to each VLR in the visited network, independently. This eventually disrupts signaling whenever the GLR goes down, resulting in loss of roaming revenue for the visited network operator.

In accordance with the foregoing, there is a need in the art of a system, a method, and a computer program product, which provides a visited network operator with a GLR (or enhances the functionality of its existing GLR) that enables the visited network operator to provide various network based VASs (using the application logic) at a centralized location in the network, in addition to handling the GLR failure scenario.

SUMMARY

The present invention is directed towards a method for providing roaming services to one or more subscribers that are registered in a VPMN and are correspondingly associated with one or more HPMNs. The method includes allocating a pool of Global Titles (GTs) to a Gateway Location Register (GLR) that is associated with the VPMN, where the pool of GTs correspond to at least one of: one or more VLRs associated with the VPMN, one or more SGSNs associated with the VPMN, the one or more HPMNs, and one or more HLRs associated with an HPMN from the one or more HPMNs. The method further includes facilitating mobile communication of these subscribers in the VPMN.

Another aspect of the present invention presents a system for providing roaming services to one or more subscribers that are registered in a VPMN and are correspondingly associated with one or more HPMNs. The system includes a GLR associated with the VPMN. The GLR is allocated a pool of GTs corresponding to at least one of: one or more VLRs associated with the VPMN, one or more SGSNs associated with the VPMN, the one or more HPMNs, and one or more HLRs associated with an HPMN from the one or more HPMNs. Further, the GLR facilitates mobile communication of these subscribers in the VPMN.

Yet another aspect of the present invention provides a computer program product including a computer usable program code for providing roaming services to one or more subscribers that are registered in a VPMN and are correspondingly associated with one or more HPMNs by allocating a pool of Global Titles (GTs) to a Gateway Location Register (GLR) that is associated with the VPMN. The pool of GTs corresponds to at least one of: one or more VLRs associated with the VPMN, one or more SGSNs associated with the VPMN, the one or more HPMNs, and one or more HLRs associated with an HPMN from the one or more HPMNs. Further, the computer program product facilitates mobile communication of these subscribers in the VPMN using the GLR.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system, a method, and a computer program product that provides roaming services to all its inbound roamers that are associated with their respective HPMNs (i.e. one or more HPMNs may have their corresponding subscribers) and are registered with a visited network. An operator of the visited network deploys a Gateway Location Register (GLR) having enhanced functionalities to provide roaming services to its inbound subscribers. It will be apparent to a person skilled in the art that roaming services include standard call and non-call related activities, such as, but not limited to, Mobile Originated (MO) call, Mobile Terminated (MT) call, Short Message Service (SMS), Packet Data Network (PDN), and other Value Added Services (VAS) such as SMS forwarding and SMS filtering. Furthermore, both the method and the system allow sharing of the GLR between multiple visited network operators, and also handle GLR fail over scenario. Various enhanced functionalities of the GLR will be described later in context with various embodiments of the present invention.

Prior Art GLR System Implementation

In earlier solutions, the GLR was allocated a single Global Title (GT) corresponding to the visited network, in order to allow the GLR to interact with various Visited Location Registers (VLRs) and Serving GPRS Support Nodes (SGSNs) associated with the visited network, and various Home Location Registers (HLRs) associated with the home network.

Figure 1:
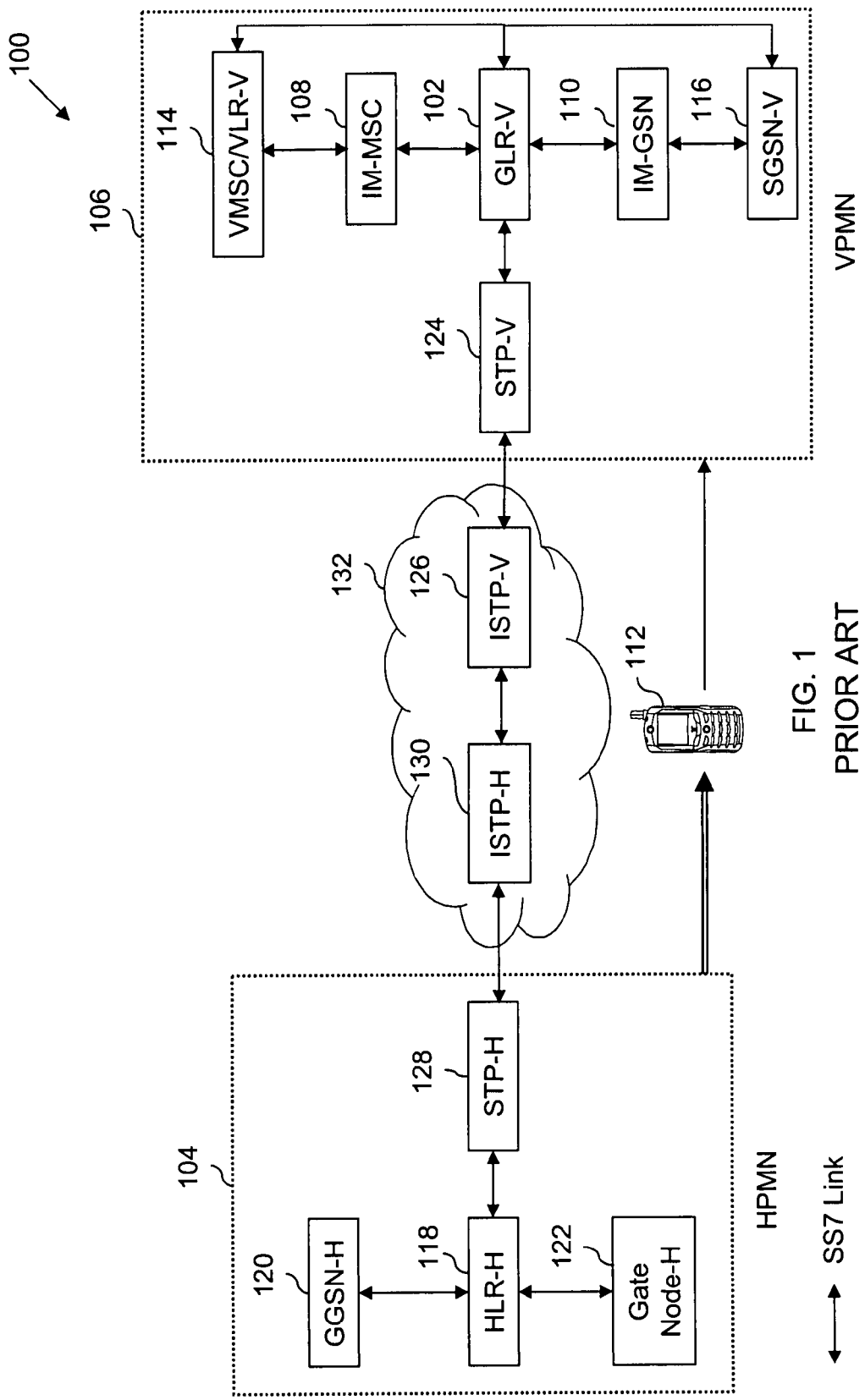
FIG. 1 represents a prior art system architecture of a Gateway Location Register (GLR) that is deployed in a Visited Public Mobile Network (VPMN)

Moreover, the GLR was introduced with the idea of reducing signaling overheads, and was involved only during Location Update (LUP) process of subscribers that were roaming in the visited network. FIG. 1 represents a prior art system 100 that illustrates a logical network model of a GLR 102. Prior art system 100 includes a Home Public Mobile Network (HPMN) 104 (i.e. the home network) and a Visited Public Mobile Network (VPMN) 106 (i.e. the visited network), where VPMN 106 operator deploys GLR 102. VPMN 106 further includes an Intermediate Mobile Switching Center (IM-MSC) 108 and an Intermediate GSN (IM-GSN) 110, both coupled to GLR 102. It will be apparent to a person skilled in the art that IM-MSC 108 is a logical node and represent Mobile Switching Centers (MSCs) in VPMN 106, whereas IM-GSN 110 represents an SGSN for GPRS Tunneling Protocol (GTP) signaling termination in VPMN 106. Since GLR 102 resides in VPMN 106, it is hereinafter referred to as GLR-V 102. Moreover, for the sake of convenient reference, GLR-V 102, IM-MSC 108, and IM-GSN 110 are hereinafter collectively referred to as GLR-V 102. When a subscriber 112, who is associated with HPMN 104, makes his first attempt to register with VPMN 106 as its inbound roamer, the operator of VPMN 106 caches profile information of subscriber 112 using GLR-V 102.

Prior art system 100 further includes in VPMN 106, a VLR 114 that is integrated with a VMSC, and an SGSN 116. Since VLR 114 communicates with its integrated VMSC using an internal communication interface (called B-interface) and a Sub System Number (SSN), and they collectively reside in VPMN 106, they are hereinafter interchangeably referred to as VMSC/VLR-V 114. However both VLR and VMSC may have different logical addresses. Moreover, since SGSN 116 resides in VPMN 106, it is hereinafter referred to as SGSN-V 116. Furthermore, HPMN 104 includes an HLR 118, a Gateway GPRS Support Node (GGSN) 120, and a Gate Node 122. Since HLR 118, GGSN 120, and Gate Node 122 reside in HPMN 104, they are hereinafter referred to as HLR-H 118, GGSN-H 120, and Gate Node-H 122, respectively. It will be apparent to a person skilled in the art that HLR-H 118 stores profile information corresponding to all subscribers of HPMN 104, whereas Gate Node-H 122 represents a Gateway MSC (GMSC), a Gateway Mobile Location Centre (GMLC), or a Short Message Service GMSC (SMS-GMSC).

Subscriber 112's signaling in VPMN 106 is routed to HPMN 104 via a roaming Signaling Transfer Point (STP) 124 and an International STP (ISTP) 126. Since STP 124 and ISTP 126 reside in VPMN 106, they are hereinafter referred to as STP-V 124 and ISTP-V 126, respectively. Similarly, subscriber 112's signaling in HPMN 104 is routed to VPMN 106, via an STP-H 128 connected to an ISTP-H 130. Both ISTP-H 130 and ISTP-V 126 communicate with each other via a Signaling System #7 (SS7) signaling architecture 132. The signals exchanged between both these networks are Transaction Capabilities Application Part (TCAP) including Mobile Application Part (MAP), Camel Application Part (CAP) and the like based signals. In another embodiment of the present invention, the signals exchanged are Signaling Connection Control Part (SCCP) based routing signals. It will be apparent to a person skilled in the art that any network element in HPMN 104 and VPMN 106 may communicate with each other via SS7 signaling architecture 132. It will also be apparent to a person skilled in the art that VPMN 106 and HPMN 104 may also include various other network components (not shown in FIG. 1), depending on the architecture under consideration.

As indicated earlier, GLR-V 102 in prior art system 100 is allocated single GT for interacting with various VLRs (and SGSNs) in VPMN 106 and various HLRs in HPMN 104. Moreover, GLR-V 102 is involved only during LUP process of inbound roamers in VPMN 106. The allocation of single GT to GLR-V 102 has various problems such as: VPMN 106's roaming traffic gets affected in case GLR-V 102 fails; and HPMN applications that try to cache capabilities of VLRs (or SGSNs) in VPMN 106 may capture incorrect information. Moreover, various inbound roamers that are not associated with HPMN 104 may get affected when HLR-H 118 is restarted.

VPMN GLR Implementation in the Present Invention

The present invention in accordance with various embodiments provides solutions to various problems by allocating a pool of GTs to GLR-V 102 based on requirement(s) of the operator of VPMN 106. In an embodiment of the present invention, GLR-V 102 is in active mode, i.e., it facilitates exchange of all LUP process related signaling messages between VPMN 106 and HPMN 104. VPMN 106 operator uses the pool of GTs to facilitate mobile communication for all its inbound roamers. The detailed explanation of this pool allocation is given later in context with various embodiments of the present invention.

Figure 2:
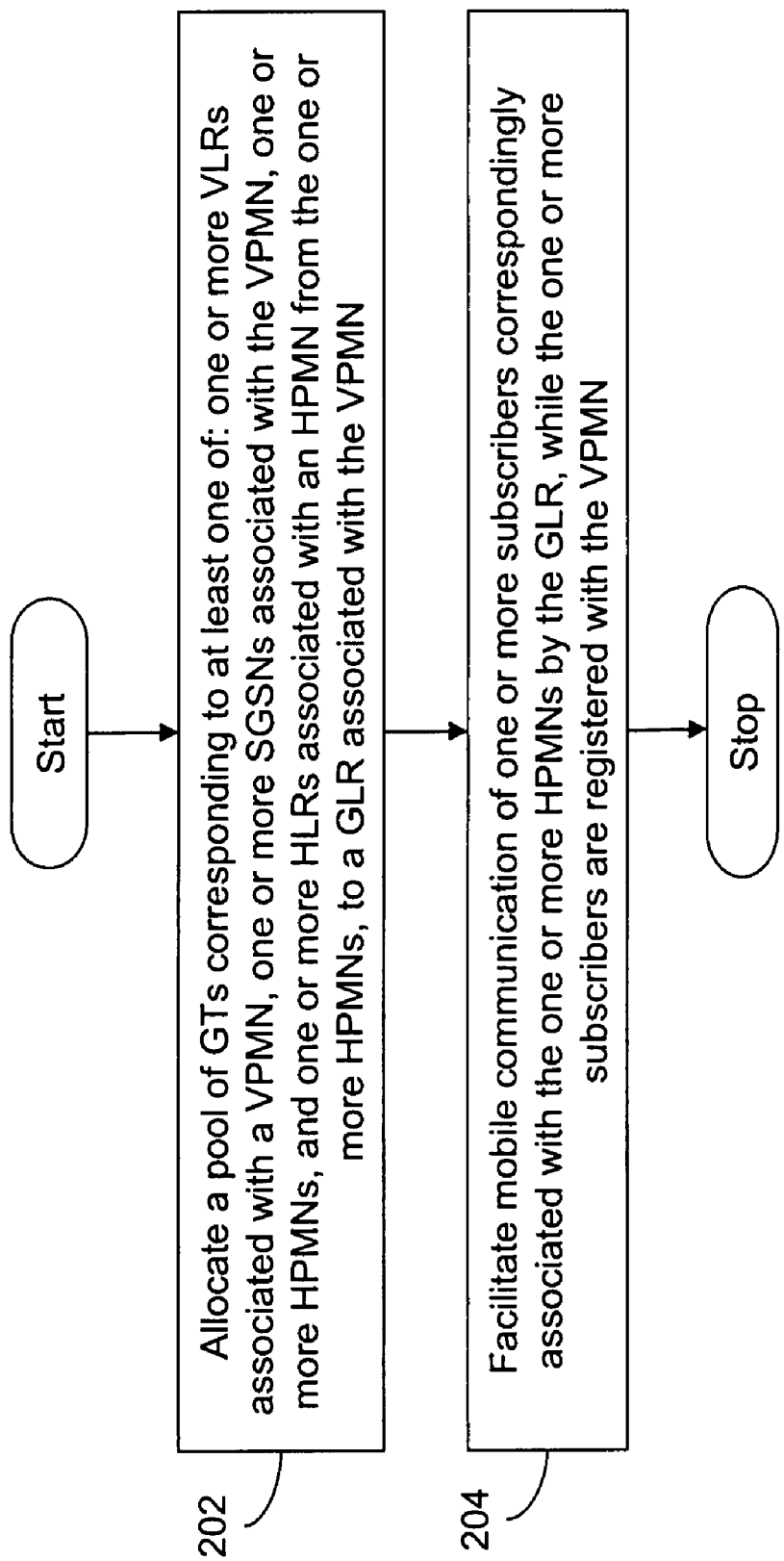
FIG. 2 represents a flowchart for implementing the GLR having enhanced functionalities in the VPMN in order to provide roaming services to one or more inbound roamers, in accordance with an embodiment of the present invention.

FIG. 2 is a flowchart for implementing GLR-V 102 having enhanced functionalities in VPMN 106 in order to provide roaming services to these inbound roamers, in accordance with an embodiment of the present invention. At step 202, an operator of a VPMN allocates a pool of GTs to a GLR associated with the VPMN, where the pool of GTs corresponds to at least one of: (a) one or more VLRs associated with the VPMN, (b) one or more SGSNs associated with the VPMN, (c) one or more HPMNs, and (d) one or more HLRs associated with an HPMN from the one or more HPMNs. In a first embodiment of the present invention, GLR-V 102 is allocated a pool of GTs corresponding to each VLR in VPMN 106. For example, if a VLR-1 has a GT-A and a VLR-2 has a GT-B then GLR-V 102 is allocated a GT-1 for emulating VLR-1 and a GT-2 for emulating VLR-2. This pool of GT-1, GT-2, and so on, has a one-to-one mapping with the actual GTs of VLRs (i.e., GT-A, GT-B, and so on). In a second embodiment of the present invention, GLR-V 102 is allocated the pool of GTs corresponding to each SGSN in VPMN 106. For example, if an SGSN-1 has a GT-C and an SGSN-2 has a GT-D, then GLR-V 102 is allocated a GT-3 for emulating SGSN-1 and a GT-4 for emulating SGSN-2. Even in this case, this pool of GT-3, GT-4, and so on, has a one-to-one mapping with the actual GTs of SGSNs (i.e., GT-C, GT-D, and so on).

In a third embodiment of the present invention, GLR-V 102 is allocated the pool of GTs corresponding to each HPMN. For example, if an HPMN-1 has a GT-E and an HPMN-2 has a GT-F, then GLR-V 102 is allocated a GT-5 for emulating HPMN-1 and a GT-6 for emulating HPMN-2. Again, the pool of GT-5, GT-6 etc. has a one-to-one mapping with the actual GT-E, and GT-F, respectively. Furthermore, in a fourth embodiment of the present invention, GLR-V 102 is allocated the pool of GTs corresponding to each HLR associated with HPMN 104. For example, if an HLR-1 has a GT-G and an HLR-2 has a GT-H (both HLR-1 and HLR-2 are in HPMN 104), then GLR-V 102 is allocated a GT-7 for emulating HLR-1 and a GT-8 for emulating HLR-2. Again, GT-7, GT-8 has a one-to-one mapping with the GT-G, and GT-H respectively. The operator of VPMN 106 can implement any one or all or any combination of these four embodiments to deal with the above mentioned problems in prior art GLR solutions (which used a single GT for all VLRs and all SGSNs in a VPMN and all HLRs in an HPMN).

Finally, at step 204, the GLR facilitates mobile communication of its inbound roamers, while they are registered with the VPMN. In an embodiment of the present invention, GLR-V 102 uses the pool of GTs corresponding to one or more VLRs and one or more SGSNs, in order to facilitate mobile communication of the inbound roamers in VPMN 106. In another embodiment of the present invention, an additional application logic module coupled to GLR-V 102 applies one or more sets of application logic to provide VAS to the inbound roamers. These sets of application logic and various other enhanced functionalities of GLR-V 102 will be explained later in context with various embodiments of the present invention.

Providing Optimal VLR/SGSN Capabilities Using VPMN GLR

As mentioned earlier, one of the problems with existing solutions is that since various VLRs and SGSNs in VPMN 106 may have different capabilities (for example, different Customized Application for Mobile Enhanced Logic (CAMEL) phases and location determination capabilities), always presenting the same GT in all LUPs on these VLRs and SGSNs may confuse some HPMN applications. For example, an HPMN application that triggers a message towards VPMN 106 to determine CAMEL phase support of each of the VLRs in VPMN 106 may end up caching incorrect information. So in order to overcome this problem, the present invention allocates the pool of GTs corresponding to each VLR (i.e. one or more VLRs) associated with VPMN 106, to GLR-V 102. In another embodiment of the present invention, in case of General Packet Radio System (GPRS), GLR-V 102 is allocated the pool of GTs corresponding to one or more SGSNs associated with VPMN 106. By doing so, the HPMN application can have a distributed view of each of these VLRs and SGSNs, while the presence of GLR-V 102 and the actual location of these VLRs and SGSNs is still hidden from the HPMN application (thereby reducing possible security risks).

VPMN GLR Implementation Using Real VLR/SGSN GTs

Another embodiment of the present invention describes an identity mapping technique. In this technique, VPMN 106 operator allocates a pool of actual VLR and SGSN GTs to GLR-V 102, thereby mapping the identity of real VLRs and SGSNs to GLR-V 102. In contrast to the above embodiment, this identity mapping technique uses the actual GT of a VLR (or an SGSN), rather than using a new GT corresponding to the VLR (or the SGSN). In an exemplary case, upon receiving an 'X' message from VMSC/VLR-V 114 with Called Party Address (CdPA) as a Signal Point Code (SPC) of HLR-H 118 and Calling Party Address (CgPA) as an SPC of VMSC/VLR-V 114, GLR-V 102 uses the actual GT of VLR-V 114 as the CgPA to interact with HLR-H 118. This eliminates the requirement of additional GTs, since it uses the existing VLR GTs to form the pool of GTs that is used by GLR-V 102.

Handling a VPMN GLR Failure Scenario

In the prior art, when GLR-V 102 would go down (for example, due to malfunctioning or improper software upgrade of GLR-V 102), all MT services from HPMN 104 to their outbound roamers (i.e. HPMN 104 subscribers that are roaming in VPMN 106), irrespective of their HLRs would be affected. So in order to overcome this problem, in accordance with an embodiment of the present invention, the pool of GLR-V 102 GTs corresponding to one or more VLRs (or one or more SGSNs) associated with VPMN 106 is used. However this requires configuring an STP associated with VPMN 106 (i.e. STP-V 124 or ISTP-V 126), to redirect all signaling messages corresponding to its inbound roamers, to GLR-V 102. In other words, STP-V 124 (or ISTP-V 126) is configured for each GT of GLR-V 102, to route these signaling messages to an SPC of GLR-V 102. The signaling messages correspond to various MAP messages such as, but not limited to, a Send Authentication Information (SAI), a LUP, an Insert Subscriber Data (ISD), a Send Routing Information (SRI), a Send Routing Information for Short Message (SRI-SM), a RestoreData, and a Provide Roaming Number (PRN). In another embodiment of the present invention, when GLR-V 102 fails, STP-V 124 or (ISTP-V 126) is configured to provide failover support by routing signaling messages with a GT of GLR-V 102 to the GTs corresponding real VLR (or SGSN in case subscriber 112 is a GPRS subscriber), instead of GLR-V 102. For example, when GLR-V 102 fails, and STP-V 124 or ISTP-V 126 receives a signaling message originating from HPMN 104 and intended for VPMN 106, it (i.e. STP-V 124 or ISTP-V 126) redirects the received message to an SPC of VLR-V 114 or a VLR-X, depending on whether GLR-V 102 GT in that signaling message corresponds to VLR-V 114, or VLR-X, respectively. The same redirection logic also holds true in case of SGSN-V 116 GT. This way, even when GLR-V 102 goes down for any reason, STP-V 124 or ISTP-V 126 can still route all signaling messages from HPMN 104 on the GLR-V 102 GT towards the corresponding VLR (or SGSN).

Handling LUP Attempts at a VPMN Based on VLR Capabilities

In an embodiment of the present invention, upon receiving a first LUP message (corresponding to a registration message) from subscriber 112 at VMSC/VLR-V 114, GLR-V 102 picks a GT from its pool of GTs corresponding to VLR-V 114, and relays the LUP message with this GLR-V 102 GT to HPMN 104. Now, in case subscriber 112 attempts to register with a new VLR (or a new SGSN), associated with VPMN 106, which has capabilities similar to that of VLR-V 114, GLR-V 102 directly provides subscriber profile information to this new VLR (or SGSN), without involving HPMN 104 in the LUP process. In another embodiment of the present invention, in case subscriber 112 moves to a new VLR-1 (of VPMN 106), which has new capabilities (e.g., new CAMEL phases, Location Determination, Bearer Services (BS), etc.) with respect to previous VLR-V 114, the LUP message received at the new VLR-1 is relayed to HLR-H 118 via GLR-V 102. This is due to the fact that the new VLR-1 requires updated subscriber profile information, which is available with HLR-H 118. Moreover, since the VLR location of subscriber 112 has changed, GLR-V 102 picks a new GLR-V 102 GT (from its pool of GTs) corresponding to this new VLR-1. GLR-V 102 relays the received LUP message to HLR-H 118, with CgPA as the new GLR-V 102 GT. Statistically, it is expected that a subscriber registers at a VLR with which he last registered. Hence the probability of subscriber 112 moving to different VLRs is less, since subsequent LUP attempts will be at VMSC/VLR-V 114. This provides an increased chance of failover support to GLR-V 102. It will be apparent to a person skilled in the art that all the above embodiments refer to GSM registration of subscriber; however, in case of a GPRS registration, VMSC/VLR-V will be replaced with a corresponding SGSN-V.

Handling HLR RESET Scenario Using VPMN GLR

The present invention in an embodiment addresses the HLR reset scenario. In this case, HLR-H 118 sends a RESET message to GLR-V 102, which acts as a VLR of subscriber 112 for HLR-H 118. It will be apparent to a person skilled in the art that the RESET message includes an HLR number or an International Mobile Subscriber Identity (IMSI) list of the affected subscribers as the parameters. Thereafter, GLR-V 102 relays the RESET message to the actual VLR associated with VPMN 106, with GLR-V 102 GT as the HLR number, and the received IMSI list as the parameters in the RESET message. However the VLR may only look at the HLR number parameter in the RESET message. On the other hand, in the prior art GLR implementation, when GLR-V 102 used single GT to represent itself as HLR-H 118 to the VLR, many other inbound roamers, including those from different HPMNs, which were not related to HLR-H 118, also got reset due to HLR-H 118 RESET. In other words, when HLR-H 118 restarts, upon receiving the RESET message from HLR-H 118, GLR-V 102 sends this RESET message to various other VLRs including those inbound roamers who were not associated with HLR-H 118. Hence in order to overcome the above mentioned problem, the present invention allocates the pool of GTs corresponding to one or more HPMNs to GLR-V 102, in accordance with one embodiment of the present invention. This means that GLR-V 102 can now use a separate GLR-V 102 GT for each HPMN (common for all HLRs associated with that HPMN). Hence the RESET message from HLR-H 118 now does not affect mobile communication of inbound roamers from other HPMNs (i.e. other than HPMN 104). In other words, the RESET of HLR-H 118 affects the mobile communication of only those inbound roamers who are associated with HPMN 104.

Alternatively, in accordance with another embodiment of the present invention, GLR-V 102 is allocated the pool of GTs corresponding to one or more HLRs associated with HPMN 104. This means that GLR-V 102 uses a separate GLR-V 102 GT for each HLR in HPMN 104. Hence the RESET message from HLR-H 118 now does not even affect mobile communication of inbound roamers associated with other HLRs of the same HPMN 104. In other words, the RESET of HLR-H 118 affects the mobile communication of only those inbound roamers who are associated with HLR-H 118.

Figure 3:
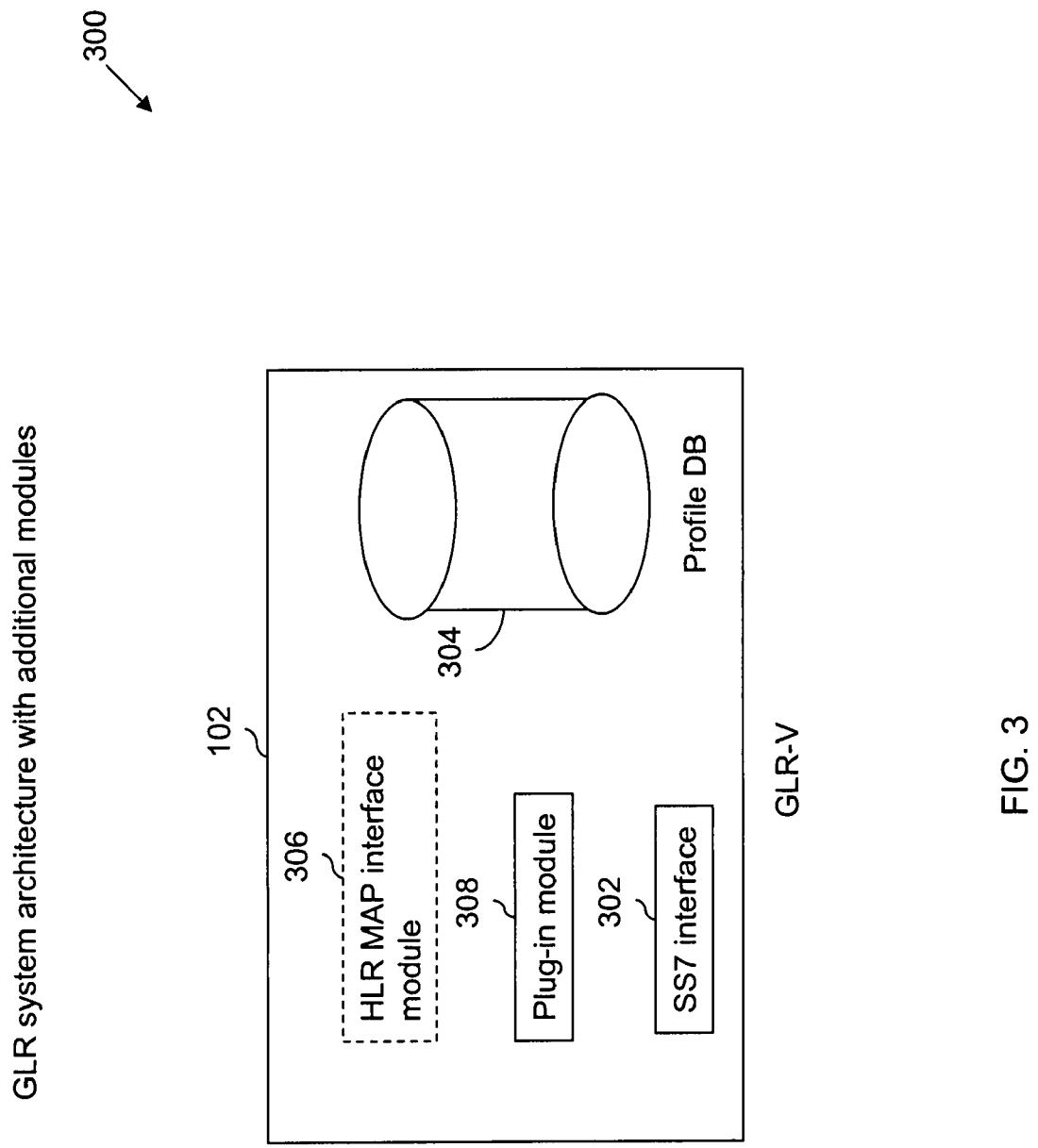
FIG. 3 represents a first system architecture of the GLR in the VPMN, in accordance with an embodiment of the present invention.

Handling of Selected Signaling Messages Using VPMN GLR and HLR Map Interface Module As mentioned earlier in the context of the present invention, GLR-V 102 can perform various enhanced functionalities, which were not performed in the prior art implementations. FIG. 3 represents a first system architecture 300 of GLR-V 102, in accordance with an embodiment of the present invention. The first system architecture 300 includes an SS7 interface 302 and a profile Database (DB) 304. GLR-V 102 uses SS7 interface 302 to interface with various signaling units, whereas profile DB 304 stores information such as, but not limited to, subscriber profile information and VMSC/VLR address of inbound roamers. Furthermore, GLR-V 102 includes an optional HLR MAP interface module 306 that is a configurable module placed in GLR-V 102. It enhances the functionalities of GLR-V 102 by allowing GLR-V 102 to respond to some selected signaling messages, intended for HPMN 104 and originating from VPMN 106, eventually resulting in facilitating mobile communication of subscriber 112 in VPMN 106. Since HLR MAP interface module 306 is an optional component in GLR-V 102, it is represented with dotted lines in FIG. 3. It will be apparent to a person skilled in the art that since HLR MAP interface module 306 works as an integrated unit inside GLR-V 102, functionalities of HLR MAP interface module 306 may also be incorporated as functionalities of GLR-V 102. The selected signaling messages handled by HLR MAP interface module 306 includes, but are not limited to:

a) SRI-SM: This allows GLR-V 102 to respond an SRI-SM query on subscriber 112's MSISDN (hereinafter interchangeably referred to as MSISDN-A) with an IMSI of subscriber 112 (hereinafter referred to as IMSI-A), along with the VMSC/VLR-V 114 (or SGSN-V 116) address of subscriber 112, in order to provide optimized SMS delivery. In another embodiment of the present invention, GLR-V 102 returns location information and IMSI-A in response to the SRI-SM query. For example, when a first node (like a signal gateway or any other application) in VPMN 106 sends the SRI-SM query to GLR-V 102, VMSC/VLR-V 114 address is returned along with the IMSI-A. The first node can then issue a MAP Provide Subscriber Location (PSL) message to VMSC/VLR-V 114.

b) SRI: This allows GLR-V 102 to respond an SRI query with an MSRN of subscriber 112, after sending a PRN message to a known VLR address of subscriber 112, in order to provide optimized call delivery. For example, when GLR-V 102 receives the SRI query from a second node (like a GMSC) in VPMN 106, GLR-V 102 issues the PRN message to VMSC/VLR-V 114 to retrieve subscriber 112's MSRN, and then returns the MSRN to the second node. So the handling of SRI-SM and SRI messages can help in facilitating mobile communication of subscriber 112 in VPMN 106.

c) Any Time Interrogation (ATI): This allows GLR-V 102 to respond to an ATI query with subscriber 112's current location information (e.g., a cell ID) and states (e.g., subscriber busy), after sending a Provide Subscriber Information (PSI) message to the known VLR address of subscriber 112, in order to provide Location Service (LCS) to subscriber 112. For example, when GLR-V 102 receives the ATI query from a third node (like any VAS application) in VPMN 106, GLR-V 102 sends the PSI to VMSC/VLR-V 114 to retrieve subscriber 112's location information and states, and then returns the retrieved information to the third node.

d) Anytime Subscription Information (ATSI): This allows GLR-V 102 to respond an ATSI query with subscriber 112's information (e.g., forwarding numbers). For example, when GLR-V 102 receives the ATSI query from the third node, GLR-V 102 sends the PSI to VMSC/VLR-V 114 to retrieve subscriber 112's information and states, and then returns the retrieved information to the third node.

e) SRI-GPRS: This allows GLR-V 102 to respond an SRI-GPRS query with an SGSN-V 116 address of subscriber 112, in order to allow a GGSN associated with VPMN 106 to initiate GPRS interactions with SGSN-V 116. For example, when GLR-V 102 receives the SRI-GPRS query from a fourth node (such as a GGSN-V) in VPMN 106, GLR-V 102 returns subscriber 112's SGSN-V 116 address to the fourth node, and then issues a Packet Data Protocol (PDP) notification message to SGSN-V 116 to initiate GPRS interactions.

f) SRI-LCS: This allows GLR-V 102 to respond an SRI-LCS query with VMSC/VLR-V 114 address of subscriber 112, in order to allow a fifth node, e.g., a Gateway Mobile Location Centre (GMLC) in VPMN 106 to retrieve subscriber 112's location information and support from VMSC-V 114. In such a case, when GLR-V 102 receives the SRI-LCS query from the GMLC, GLR-V 102 returns VMSC-V 114 address of subscriber 112 to GMLC. GMLC can then issue a PSL message to VMSC-V 114 to retrieve subscriber 112's location information and support in VMSC-V 114. It will be apparent to a person skilled in the art that the GMLC is a location gateway that enables a network operator to offer Location Based Services (LBS).

In an embodiment of the present invention, by having these messages configured per HPMN, the operator of VPMN 106 uses GLR-V 102 to decide whether to respond to received signaling messages based on application requirements (like handling of call, SMS, GPRS, LCS and LBS) and inter-operator relationships. GLR-V 102 further includes a plug-in module 308 as an additional application logic module that applies various application logic such as, but not limited to, determining whether to send a LUP message (received from VPMN 106) to HPMN 104, whether to remove or use cached profile of subscriber 112 (i.e. stored at GLR-V 102) to respond to the LUP message, whether to modify subscriber 112's profile prior to sending an ISD message (corresponding to an update message) to VMSC/VLR-V 114 (or SGSN-V 116), and whether to apply any additional VAS. In other words, plug-in module 308 facilitates exchange of one or more signaling messages, such as the LUP message from VMSC/VLR-V 114 and the ISD message from HLR-H 118, between GLR-V 102, HPMN 104, and VPMN 106. It will also be apparent to a person skilled in the art that the first system architecture 300 may also include various other network components (not shown in FIG. 3), depending on the architecture under consideration.

Furthermore, in accordance with an embodiment of the present invention, by using plug-in module 308, the operator of VPMN 106 can provide various kinds of VAS to its inbound roamers, based on implementation of GLR-V 102 and requirement(s) of the operator of VPMN 106. In accordance with various embodiments of the present invention, the following are examples of exemplary application logic that are implemented by plug-in module 308.

Providing SIMM Services Using VPMN GLR

In a first application logic, GLR-V 102 modifies an ISD message to send a VPMN 106 Mobile Station International Subscriber Directory Number (MSISDN), instead of an HPMN 104 MSISDN to VPMN 106. In an embodiment of the present invention, when the ISD message is received at GLR-V 102 from HPMN 104 (in response to LUP message from VPMN 106 to HPMN 104), GLR-V 102 modifies the ISD message by replacing the HPMN 104 MSISDN with the VPMN 106 MSISDN that corresponds to a local number in VPMN 106, and thereafter sends the modified ISD message to VPMN 106. A detailed explanation of this type of application logic, outside the context of the present invention, is known in the art, and for example is taught in U.S. patent application Ser. No. 10/782,681, entitled "Providing multiple MSISDN numbers in a mobile device with a single IMSI", filed on Feb. 18, 2004.

Providing MIMM Services Using VPMN GLR

In a second application logic, GLR-V 102 modifies a signaling message, such as an ISD-ACK (i.e. a response to the ISD message), to send an HPMN 104 IMSI (i.e. IMSI associated with HPMN 104), instead of a VPMN 106 IMSI (i.e. IMSI associated with VPMN 106) to HPMN 104. In an embodiment of the present invention, when the ISD-ACK message is received at GLR-V 102 from VPMN 106, GLR-V 102 modifies the ISD-ACK message by replacing the HPMN 104 MSISDN with the VPMN 106 MSISDN, and thereafter sends the modified ISD-ACK message to VPMN 106. This type of application logic, outside the context of the present invention, is known in the art, for example in the teaching of U.S. patent application Ser. No. 10/918,645 entitled "Signaling Gateway with Multiple IMSI with Multiple MSISIDN (MIMM) Service in a Single SIM for Multiple Roaming Partners", filed on Aug. 13, 2004. Moreover, in the first and second application logic mentioned above, a roaming logic (i.e. a SIMM roaming logic in case of first application logic and a MIMM roaming logic in case of second application logic) is built within GLR-V 102, instead of a separate SS7 node. GLR-V 102 uses the roaming logic to check if any modification(s) in the ISD/ISD-ACK message is required in these two exemplary application logic.

Removing Call-Barring Restriction Using VPMN GLR

Furthermore, in a third application logic, GLR-V 102 modifies (or removes) a Call Barring (CB) parameter from the ISD message prior to sending this ISD message to VPMN 106. In one embodiment of the present invention, when GLR-V 102 receives an ISD message with a CB parameter (e.g., Operator Determined Barring (ODB) or CB supplementary service) from HPMN 104, GLR-V 102 removes the call barring parameter from the ISD message and sends the modified ISD message to VPMN 106. This allows the operator of VPMN 106 to enable calls of inbound roamers even when HPMN 104 has barred calls (outgoing or incoming) for these inbound roamers. In another embodiment of the present invention, when GLR-V 102 receives an ISD message with a supplementary service status (e.g., call forwarding status) from HPMN 104, GLR-V 102 modifies the supplementary service status to disable call forwarding and sends the modified ISD message to VPMN 106.

Controlling Late-Call-Forwarding Using a VPMN GLR

In a fourth application logic, GLR-V 102 modifies subscriber 112's forwarding numbers to control late call forwarding. In an embodiment of the present invention, GLR-V 102 modifies the ISD message by replacing a Forward-To Number (FTN) with a modified FTN associated with HPMN 104, and then sends the modified FTN in the ISD message to VPMN 106.

Implementing an Inbound Traffic Redirection Mechanism Using VPMN GLR to Control Roaming Traffic Distribution Furthermore, in a fifth application logic, GLR-V 102 caches profile information of its inbound roamers based on pre-defined criteria to control roaming traffic distribution of these inbound roamers in a visiting country. In an embodiment of the present invention, GLR-V 102 caches profiles of those inbound roamers, which contributes largely to VPMN 106 operator's revenue. The pre-defined criteria include, but are not limited to, inbound roamers with high usage, roamers with 3G support, roamers without any CAMEL support, GPRS roamers, prepaid roamers, and postpaid roamers. In another embodiment of the present invention, GLR-V 102 caches profiles of new roamers, who are more valuable than inbound roamers from HPMN 104, whose profiles are already cached at GLR-V 102. In such a case, GLR-V 102 swaps some existing inbound roamers from HPMN 104 for some new roamers from HPMN 104, since these new roamers are more valuable than existing ones. This may be because the caching threshold for HPMN 104 has been exceeded. In yet another embodiment of the present invention, GLR-V 102 stops caching new roamers from HPMN 104 until one of the following thresholds are satisfied:

a) Caching of inbound roamers associated with HPMN 104 is within the threshold.
b) Inbound roamers from HPMN 104 to be cached are within a pre-defined percentage for HPMN 104.
c) There is a pre-defined ratio of LUP messages answered by GLR-V 102 to LUP messages rejected by HPMN 104.

The above thresholds are VPMN 106 operator configurable. Moreover, the application logic in these embodiments may be defined per HPMN operator.

Implementing an Inbound Traffic Redirection Mechanism Using a VPMN GLR to Retain Inbound Roamers Affected Due to an HPMN SoR Attempt Additionally, in a sixth application logic, GLR-V 102 detects Steering of Roaming (SoR) attempt from HPMN 104. In an embodiment of the present invention, GLR-V 102 detects HPMN 104's attempt to redirect all inbound roamers from VPMN 106 (which may be a non-preferred VPMN with respect to HPMN 104 in this case) to a preferred VPMN. GLR-V 102 then caches profile information of these inbound roamers, thus helping the operator of VPMN 106 to retain its inbound roamers from further HPMN 104 SoR attempts during subsequent location changes within VPMN 106. These fifth and sixth sets of application logic, outside the context of the present invention, are known in the art and are taught, for example in U.S. patent application Ser. No. 11/819,164, entitled "A Network Based Framework for Retaining Inbound Roamers—Inbound Traffic Redirection Based on HLR Errors or VLR Errors", filed on Jun. 25, 2007, and U.S. patent application Ser. No. 11/402,128 entitled "Inbound traffic redirection system", filed on Apr. 12, 2006.

Implementing Anti-Traffic Redirection and Anti-Inbound Traffic Redirection Mechanisms Using a VPMN GLR to Thwart HPMN SOR and Competitor VPMN ITR Furthermore, in a seventh application logic, GLR-V 102 thwarts the SoR attempt from HPMN 104, in addition to thwarting an inbound SoR attempt by a competitor VPMN, by sending a first set of signaling messages (like one or more LUP messages, an ISD-ACK message, etc.) to HPMN 104 when subscriber 112 attempts to register at VPMN 106. Thwarting of HPMN 104's SoR attempt is described in greater detail in an earlier approach in U.S. patent application Ser. No. 11/374,437 entitled "Anti-traffic redirection system", filed on Mar. 14, 2006. Moreover, thwarting of the competitor VPMN's inbound SoR attempt is described in greater detail in an earlier approach in U.S. patent application Ser. No. 11/529,552 titled "Anti-Inbound Traffic Redirection and Defense Against Inbound Traffic Redirection" filed on Sep. 29, 2006.

Implementing Inbound Traffic Redirection Mechanism Using VPMN GLR for Retaining Departing Inbound Roamers In an eighth application logic set, GLR-V 102 attempts to retain subscriber 112 at VPMN 106, despite subscriber 112's attempt to register at the competitor VPMN, by sending a second set of signaling messages (such as one or more LUP messages, an SRI-SM message or an ATI message, an ISD-ACK message, etc.) to HPMN 104.

Implementing Inbound Traffic Redirection Mechanism Using VPMN GLR for Handling Handset Stuck Case Furthermore, in a ninth application logic set, GLR-V 102 detects that subscriber 112's handset is stuck in VPMN 106 due to an incomplete registration process. In an embodiment of the present invention, when subscriber 112 attempts to register with VPMN 106, due to a TR attempt by HPMN 104, subscriber 112's handset gets stuck in VPMN 106, as a result of which the handset is unable to perform any MT activities. In one embodiment of the present invention, since GLR-V 102 is in active mode, it is able to detect handset stuck scenario when: a) handset has made less than four LUP attempts at VPMN 106 (i.e. according to 3GPP 408 and 24008 standards), and b) there are no further LUP attempts by subscriber 112 at VPMN 106 for a pre-defined time interval (which may be configured by the operator of VPMN 106). In another embodiment of the present invention, GLR-V 102 detects handset stuck scenario after HPMN 104 has steered subscriber 112's roaming traffic exactly four times from VPMN 106. Thereafter, GLR-V 102 can handle the handset stuck case by restoring the mobile communication of subscriber 112 in VPMN 106. Handling of stuck handset case and restoring of subscriber 112's mobile communication are described later in detail in conjunction with FIGS. 5A and 5B, and FIG. 6. Details of the eighth and ninth application logic sets are explained in an earlier approach given in U.S. patent application Ser. No. 11/819,164, entitled "A Network Based Framework for Retaining Inbound Roamers—Inbound Traffic Redirection Based on HLR Errors or VLR Errors", filed on Jun. 25, 2007.

Implementing Inbound Traffic Redirection Mechanism Using VPMN GLR for Creating O-CSI and T-CSI for Inbound Roamers Moreover, GLR-V 102 can create a fake CAMEL Subscription Information (CSI) for its inbound roamers when they wish to use CAMEL services in VPMN 106. Hence in a tenth application logic set, GLR-V 102 creates CSI for these roamers and responds either to a LUP message from VPMN 106 with nested ISD messages containing the created CSI, or to a LUP-ACK message (corresponding to a registration response message) from VPMN 106 with a standalone ISD message containing the created CSI. In one embodiment of the present invention, an Originating CSI (O-CSI) is created for subscriber 112. Creating CSI for inbound roamers is explained in greater detail in an earlier approach given in U.S. patent application Ser. No. 11/429,448 entitled "Dynamic Generation of CSI for Inbound Roamers", filed on May 8, 2006. In another embodiment of the present invention, a Terminating CSI (T-CSI) is created for subscriber 112. This embodiment is explained in greater detail in an earlier approach given in U.S. patent application Ser. No. 11/366,021 entitled "Inbound Roamer Call Control System", filed on Mar. 2, 2006.

Thus, by integrating one or more application logic sets explained above with GLR-V 102, the present invention enhances the functionality of GLR-V 102, thus making a stronger business case for VPMN operator to deploy the new and improved GLR of the present invention. Moreover, by doing so, the present invention eliminates the need for a separate SS7 node or an SS7 roaming probe. It will be apparent to a person skilled in the art that using the first system architecture 300, the VPMN operator can develop many more value enhanced roaming services. It will also be apparent to a person skilled in the art that any component in GLR-V 102 can interchangeably perform the function of any other component in GLR-V 102, in order to provide roaming services to all inbound roamers in VPMN 106.

Sharing VPMN GLR Functionalities with a Roaming HLR

Figure 4:
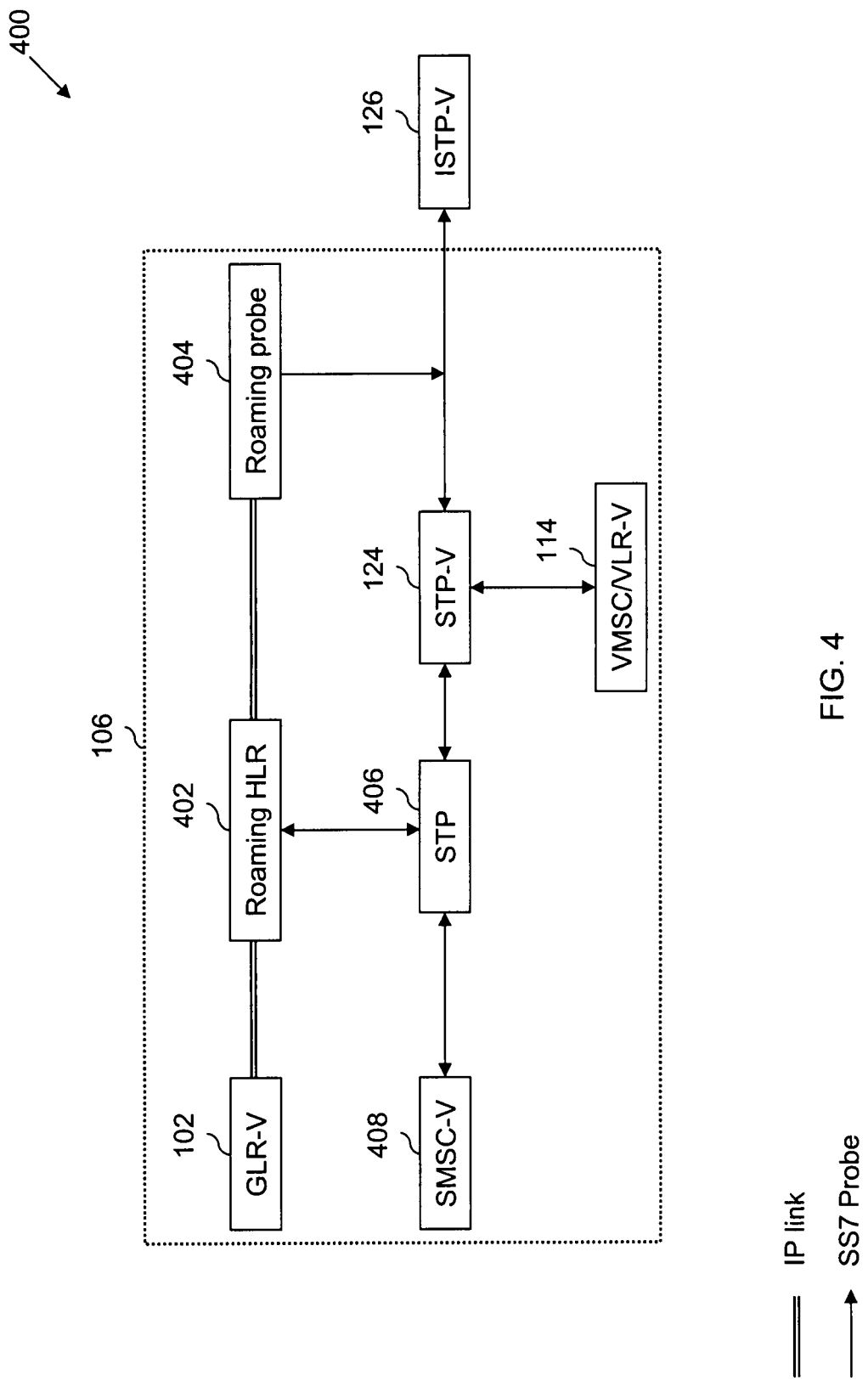
FIG. 4 represents a second system architecture of the GLR coupled to a roaming Signaling System #7 (SS7) node in the VPMN, in accordance with an embodiment of the present invention.

Since GLR-V 102 may also be involved in various other signaling interactions apart from LUP, the operator of VPMN 106 may want to share some of the functionalities of GLR-V 102 with another node. FIG. 4 represents a second system architecture 400 of GLR-V 102, where selected signaling messages are handled by a roaming SS7 node 402 coupled to GLR-V 102 in VPMN 106, in accordance with an embodiment of the present invention. Like GLR-V 102, roaming SS7 node 402 also acts as an HLR for all inbound roamers in VPMN 106. Roaming SS7 node 402 creates profile information of these inbound roamers using a roaming probe 404 which monitors the SS7 roaming links between VPMN 106 and one or more HPMNs. Second system architecture 400 illustrates an example where roaming probe 404 taps roaming links between STP-V 124 and ISTP-V 126, to create profile information of its inbound roamers. Alternatively, in another embodiment of the present invention, roaming SS7 node 402 directly retrieves the profile information from GLR-V 102, since GLR-V 102 proxies all inbound roamers' LUP messages, originating from VPMN 106 and intended for any of the HPMNs. Since roaming SS7 node 402 acts as HLR in VPMN 106 for offering VAS to its inbound roamers, it is hereinafter referred to as roaming HLR 402. Thus, roaming HLR 402 can easily be integrated with GLR-V 102, without overloading roaming partner signaling and risking fraud. GLR-V 102, roaming HLR 402, and roaming probe 404 in the second system architecture 400 communicate with each other via an Internet Protocol (IP) link. Moreover, the selected signaling messages that were earlier handled by HLR MAP interface module 306 (in first system architecture 300) can be also handled by roaming HLR 402. Various VASs provided using roaming HLR 402 are as follows:

a) Optimized SMS delivery for subscriber 112: Roaming HLR 402 responds to SRI-SM query on MSISDN-A without incurring inter-working signaling cost and possible failures.
  b) Optimized MT call routing for subscriber 112: Roaming HLR 402 responds to SRI query on the MSISDN-A without incurring roaming signaling cost and rejection from non-supporting or supporting HPMNs.
  c) Roaming HLR 402 sends T-CSI for subscriber 112 to a GMSC associated with VPMN 106 so that terminating call control on the MSISDN-A can be performed at a Signaling Control Point (SCP) associated with VPMN 106.
  d) Roaming HLR 402 responds to ATI query on the MSISDN-A (or IMSI-A) by issuing a PSL message to subscriber 112's current VLR in order to retrieve subscriber 112's current state and location information.

Roaming HLR 402 can also provide various other VASs such as, but not limited to, a Virtual Home Environment (VHE) and fraud control. Second system architecture 400 further includes an STP1-V 406 (which can also be a GMSC in VPMN 106) and a Short Message Service Center (SMSC)-V 408. It will be apparent to a person skilled in the art that SMSC-V 408 is required to provide optimized SMS delivery for subscribers roaming in VPMN 106.

Figure 5A:
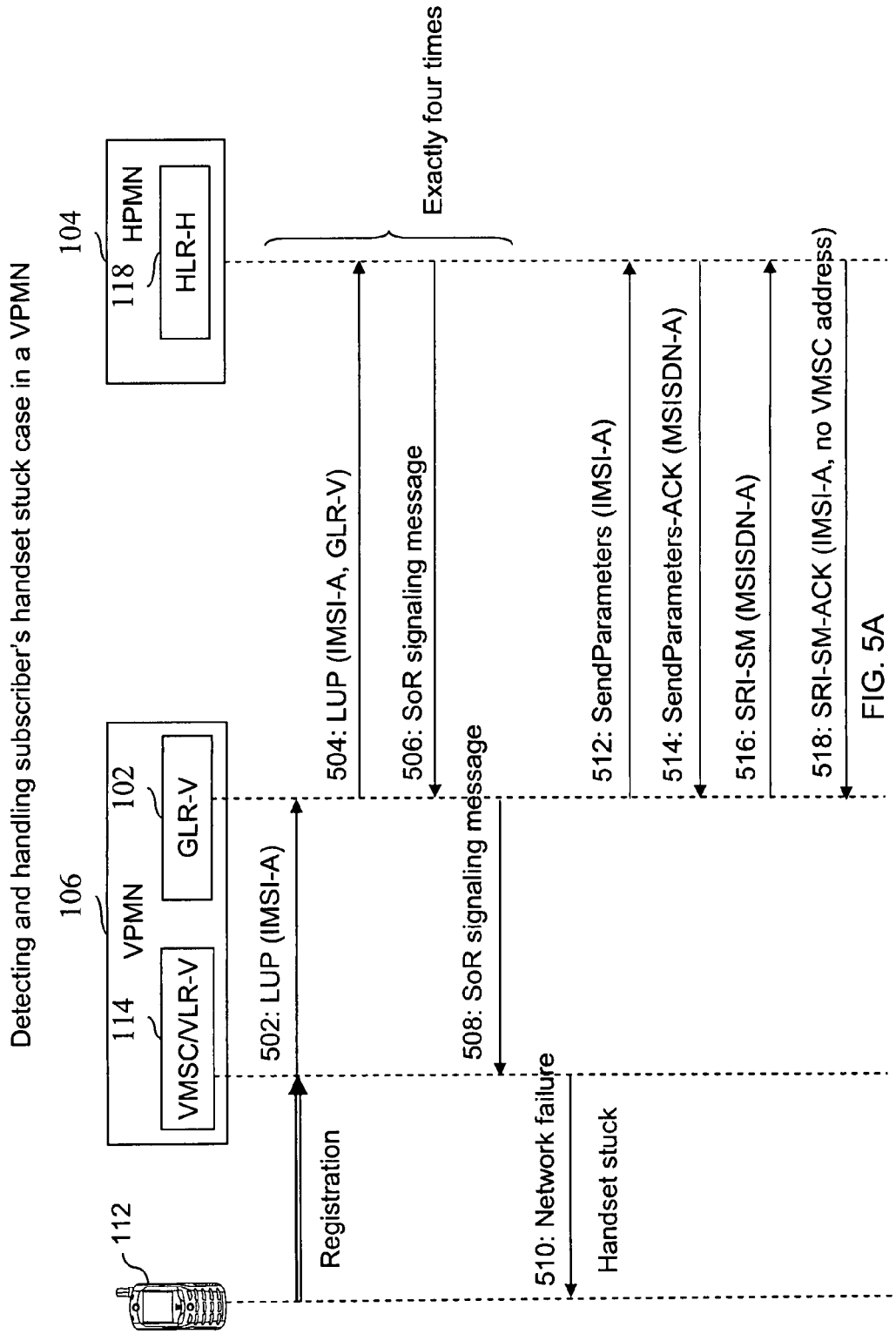
FIGS. 5A and 5B represent a flow diagram for detecting and handling a stuck handset case, when a handset of a subscriber associated with a Home Public Mobile Network (HPMN) is stuck during its registration attempt at the VPMN, in accordance with an embodiment of the present invention.
Figure 5B:
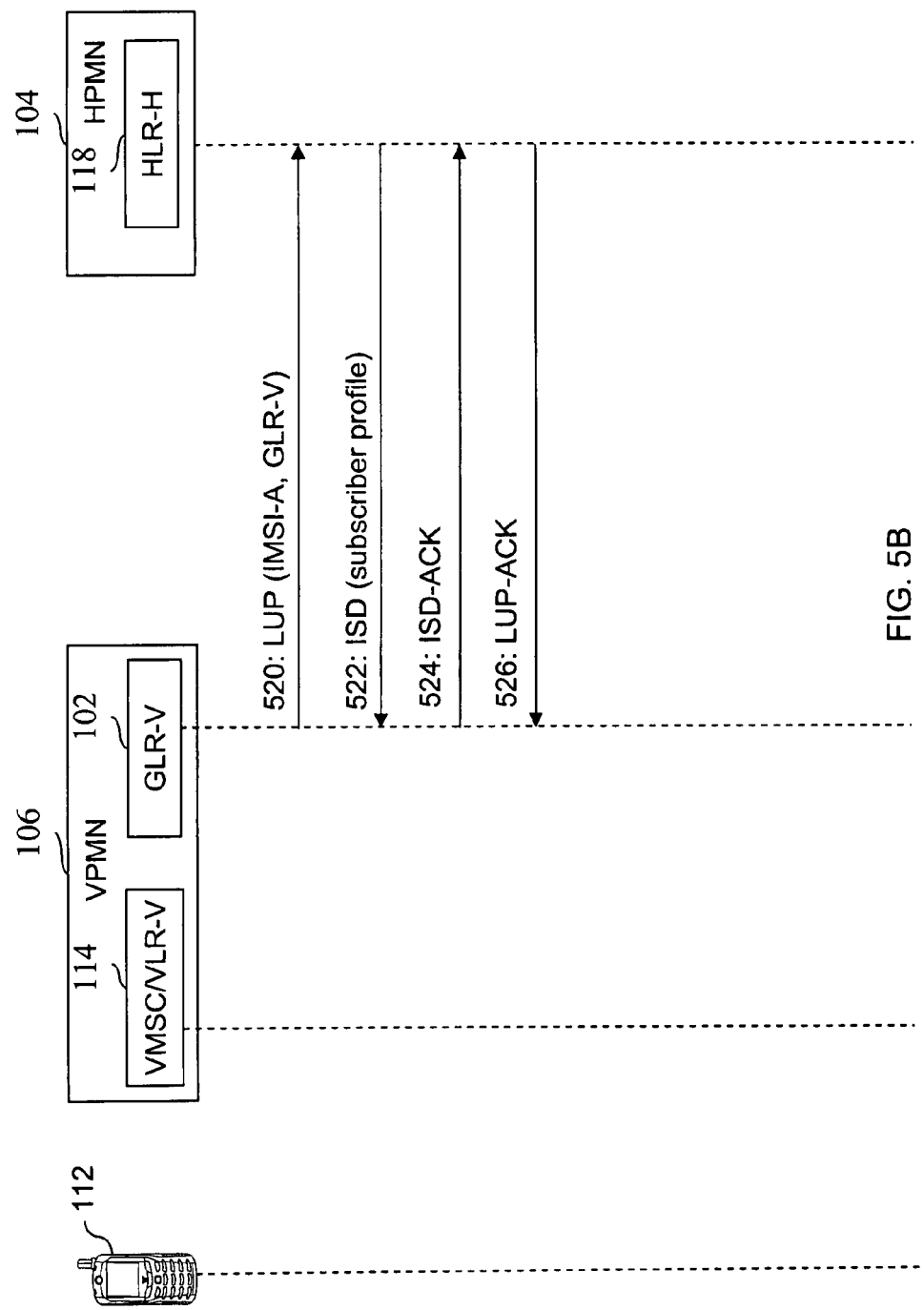

As mentioned earlier, GLR-V 102 with enhanced functionalities is also able to handle the inbound roamer's handset stuck case. FIGS. 5A and 5B represent a flow diagram for detecting and handling the stuck handset case, during subscriber 112's registration attempt at VPMN 106, in accordance with an embodiment of the present invention. In a first embodiment of the present invention, when HPMN 104 is attempting to steer subscriber 112 away from VPMN 106 and the registration process is incomplete, subscriber 112's handset gets stuck and GLR-V 102 detects this stuck condition by observing exactly four SoR signaling messages, e.g., registration response reject messages, such as a MAP Cancel Location, a TCAP-abort, a System Failure (SF), an Unexpected Data Value (UDV), a Missing Data (MD), a Roaming Restricted Due to Unsupported Feature (RRDuF), and a Roaming Not Allowed (RNA) from HPMN 104. It will be apparent to a person skilled in the art that GLR-V 102 deals with the handset stuck case with a similar technique for HPMN 104 or any other HPMN.

In this first embodiment of the present invention, at step 502, when VMSC/VLR-V 114 receives a LUP message from subscriber 112's handset, VMSC/VLR-V 114 sends the LUP message on IMSI-A to GLR-V 102. Thereafter, at step 504, GLR-V 102 uses a GLR-V 102 GT (from the pool of GTs), corresponding to VLR-V 114, to interact with HPMN 104, and sends the LUP message on the IMSI-A along with GLR-V 102 GT (emulating HPMN 104 with GLR-V 102 as VLR of subscriber 112) to HPMN 104, after modifying CgPA as GLR-V 102 GT. In an embodiment of the present invention, HPMN 104 determines VPMN 106 as a non-preferred VPMN and hence applies SoR against VPMN 106. Hence at step 506, HPMN 104 issues the registration response reject message to GLR-V 102. Furthermore, at step 508, GLR-V 102 relays the registration response reject message to VMSC/VLR-V 114, after modifying CgPA as the GLR-V 102 GT (emulating VMSC/VLR-V 114 with GLR-V 102 as HLR of subscriber 112 this time) and CdPA as VMSC/VLR-V 114. It will be apparent to a person skilled in the art that profile exchange messages, such as ISD and ISD-ACK (not shown in FIGS. 5A and 5B) are also exchanged during this LUP process of subscriber 112 at VPMN 106. As per the 3GPP 408 and 24.008 standards, subscriber 112 makes a total of four registration attempts at VMSC/VLR-V 114 and gets a LUP reject message each time (steps 502 to 508).

Now, since LUP reject message is returned due to SoR attempt from HPMN 104, VMSC/VLR-V 114 sends a network failure message indicating failure of subscriber 112's LUP attempt at VPMN 106, to subscriber 112's handset, at step 510. Thereafter, after the failure of the fourth registration attempt by subscriber 112 at VPMN 106, subscriber 112's handset may get stuck in VPMN 106. Now, in order to recover subscriber 112 from this stuck case, the operator of VPMN 106 configures GLR-V 102 to issue a MAP SendParameters message on the IMSI-A to HPMN 104, at step 512. Thereafter, at step 514, HPMN 104 returns MSISDN-A to GLR-V 102 in a MAP SendParameters-ACK message. It will be apparent to a person skilled in the art that the MAP Sendparameters message need not be sent in case GLR-V 102 has already cached MSISDN-A and IMSI-A mapping, either from an earlier successful LUP process at VPMN 106, or a prior SendParameters transaction with HPMN 104.

In order to further confirm the handset stuck case, at step 516, GLR-V 102 sends SRI-SM message to HPMN 104 to check if subscriber 112 has registered with another VPMN. Thereafter, at step 518, HPMN 104 returns an SRI-SM-ACK message on the IMSI-A without any VMSC address to GLR-V 102, confirming that subscriber 112's handset is stuck at VPMN 106. However in one embodiment of the present invention, when VMSC address returned is that of a competitor VPMN (which is competitor of VPMN 106); GLR-V 102 does not perform any further action to handle this stuck case. In another embodiment of the present invention, when subscriber 112's handset is stuck in the competitor VPMN, GLR-V 102 recovers subscriber 112 based on percentage control or threshold control per HPMN, or threshold control per inbound roamer in VPMN 106. In an exemplary case, GLR-V 102 does not recover such a stuck subscriber for a pre-defined number of times (configurable by the operator of VPMN 106) within a pre-defined time interval (which is also VPMN 106 operator configurable). In another exemplary case, GLR-V 102 does not handle such cases for more than an X % of inbound roamers associated with a particular HPMN.

Alternatively, when no VMSC address is received in the SRI-SM-ACK message and GLR-V 102 is sure that the handset is stuck, the operator of VPMN 106 configures GLR-V 102 to send another LUP message on the IMSI-A along with the GLR-V 102 GT (corresponding to VLR-V 114) as the current VLR address of subscriber 112 to HPMN 104, at step 520. This is done to restore GLR-V 102 as the location of subscriber 112 at HPMN 104, in case no VMSC address is returned from the SRI-SM-ACK message. Thereafter, at steps 522 and 524, GLR-V 102 and HPMN 104 exchange subscriber 112's profile information (i.e. exchange ISD and ISD-ACK messages). Finally, at step 526, HPMN 104 returns an LUP-ACK message, to GLR-V 102 (in response to LUP sent at step 520), indicating successful registration of subscriber 112 at VPMN 106.

Unlike the first embodiment explained above, in a second embodiment of the present invention, GLR-V 102 detects the stuck condition in less than four LUP attempts from VMSC/VLR-V 114. In other words, GLR-V 102 observes only three (or less) LUP attempts at VPMN 106, and does not observe fourth LUP attempt at the same network (i.e. VPMN 106). Steps 502 to 508 describing LUP process of subscriber 112 at VPMN 106 remain the same for this second embodiment; however, in this embodiment VMSC/VLR-V 114 sends a network failure message, at step 510, to subscriber 112's handset in less than four LUP attempts at VPMN 106. In addition, steps 512 to 518 describing the retrieval of MSISDN-A and subscriber 112's location information are not required and hence are not performed, since GLR-V 102 already has confirmation about the handset stuck condition. Also, steps 520 to 526 that describe a separate LUP process of subscriber 112, initiated by GLR-V 102, remains same even in the second embodiment.

Restoring Mobile Communication of Inbound Roamer when Handset is Stuck in VPMN

Figure 6:
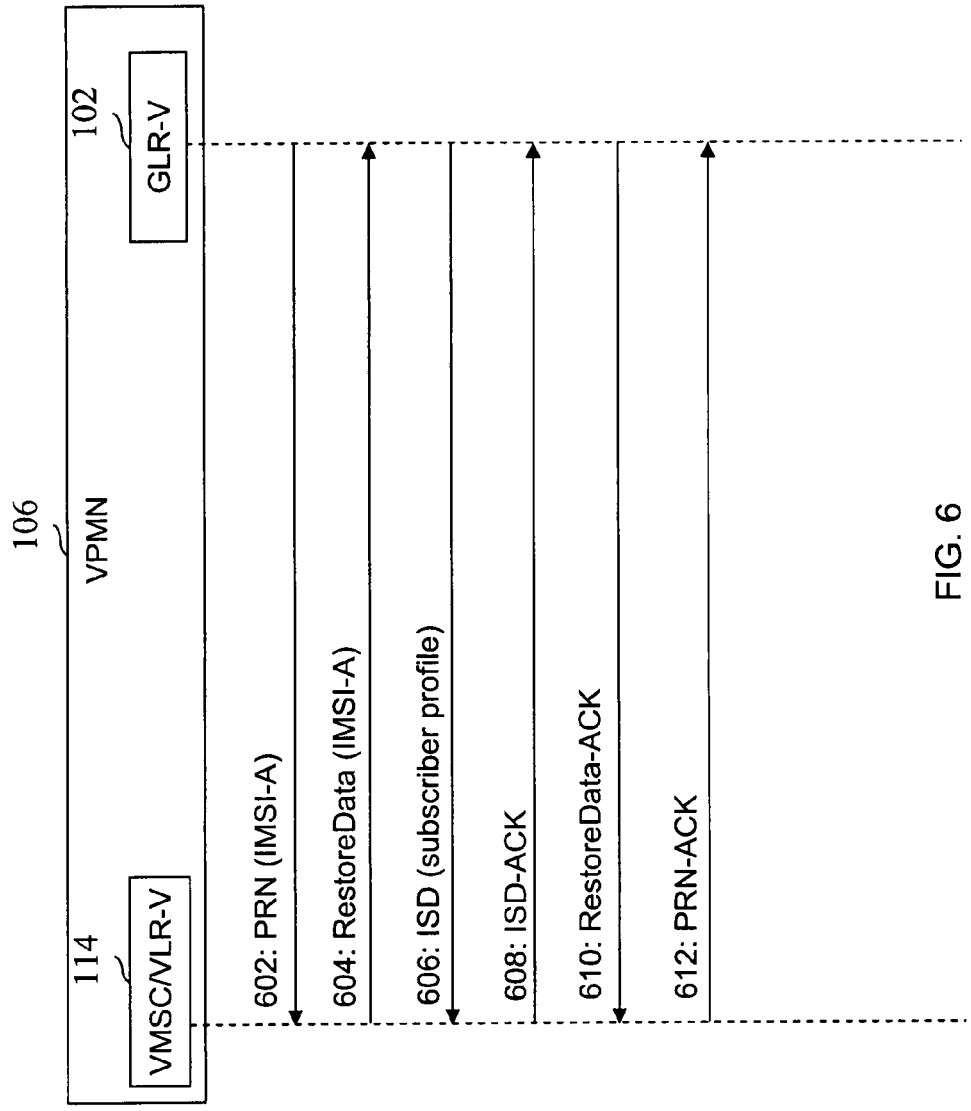
FIG. 6 represents a flow diagram for restoring Mobile Terminated (MT) call, MT Short Message Service (SMS), and data capability (i.e. General Packet Radio System (GPRS)) of the subscriber, when the subscriber's handset is stuck during its registration attempt at the VPMN, in accordance with an embodiment of the present invention.

Although subscriber 112 is able to initiate mobile activities (e.g., MO calls and SMS), he is unable to receive calls and SMS, and avail data capabilities service, once stuck in VPMN 106. Hence in order to completely facilitate mobile communication of subscriber 112 whose handset is stuck during its registration attempt(s) at VPMN 106, MT activities for this subscriber needs to be restored. FIG. 6 represents a flow diagram for restoring MT call, MT SMS, and data capability of subscriber 112, when subscriber 112's handset is stuck at VPMN 106, in accordance with an embodiment of the present invention. FIG. 6 is applicable for both of the above described first and second embodiments for handset stuck case. In order to restore subscriber 112's MT activities, the operator of VPMN 106 configures GLR-V 102 to issue MAP messages, such as a PRN, an ISD, and a RestoreData-ACK to VMSC/VLR-V 114. At step 602, GLR-V 102 issues a PRN message on the IMSI-A to VMSC/VLR-V 114. Thereafter, at step 604, VMSC/VLR-V 114 returns a RestoreData message on the IMSI-A to GLR-V 102 since VMSC/VLR-V 114 has no record of subscriber 112. GLR-V 102 then retrieves the cached subscriber 112's profile information from its database (i.e. profile DB 304 in system 300), and sends the retrieved profile information in an ISD message to VMSC/VLR-V 114, at step 606. Thereafter, at step 608, VMSC/VLR-V 114 returns an ISD-ACK message to GLR-V 102, which at step 610 sends a RestoreData-ACK message to VMSC/VLR-V 114. Finally, at step 612, GLR-V 102 sends a PRN-ACK message to VMSC/VLR-V 114, thereby facilitating mobile communication of subscriber 112 in VPMN 106.

Handling 3G Inbound Roamers Using VPMN GLR

Furthermore, some network operators may like to provide roaming services to its inbound roamers having 3G capabilities. Presently, there exist numerous 3G network operators; however, most of them are able to maintain only a 2G roaming agreement as upgrading to 3G roaming agreements requires longer time in testing and billing process checks. It will be apparent to a person skilled in the art that a network operator usually uses the same network code at a network side for both its 3G and 2G networks; however, different network codes (i.e. for 2G and 3G networks) are used for broadcasting information at an air interface. It will also be apparent to a person skilled in the art that although a handset having 3G capabilities usually first searches for a 3G network; however, most of the existing 3G capable handsets have backward compatibility, i.e., they have both 3G and 2G support. In case VPMN 106 is using same network code at the air interface for its 3G and 2G networks, and does not allow 3G roaming of subscriber 112 due to no 3G roaming agreement between HPMN 104 and VPMN 106, 3G subscriber 112 (i.e. using a 3G handset), using a 2G Subscriber Identity Module (SIM), may end up having such a network (i.e. VPMN 106) put in its forbidden list of networks for roaming in subscriber 112's 2G SIM. Moreover, in case VPMN 106 is using different network codes at the air interface for its 3G and 2G networks, and does not allow 3G roaming of subscriber 112 due to no 3G roaming agreement between HPMN 104 and VPMN 106, subscriber 112 with 2G SIM in his 3G handset may move to another 3G network when the 3G network code of VPMN 106 is put in the forbidden list of networks for roaming in subscriber 112's 2G SIM.

Therefore, in order to avoid loss of 2G roaming revenue, many 3G VPMN operators allow inbound roamers with 3G capabilities to roam in their 3G networks and charge their inbound roamers at a 2G tariff, even though these inbound roamers make use of VPMNs' 3G support. This is a case when one or more HPMNs do not have 3G roaming agreement; however, they do possess a 2G roaming agreement with these VPMN operators. However this is possible only if the 3G handset is using 2G SIM, and a 3G radio access is applying a 2G authentication (i.e. a triplet request) at VPMN 106. Upon receiving a 2G authentication request message from VPMN 106, HPMN 104 having 3G support cannot distinguish between 2G and 3G networks as they have the same network codes. Hence HPMN 104 grants authentication triplets, indicating successful completion of ongoing authentication process, to VPMN 106. Similarly, other MAP messages, such as LUP, are also not distinguished by HPMN 104, when 2G and 3G networks in VPMN 106 have the same network codes. Hence HPMN 104 responds normally as if VPMN 106 is a 2G network. However it will be apparent to a person skilled in that HPMN 104 will reject (or will not reply) these MAP messages, in case MAP messages contain some special 3G capabilities, such as, but not limited to, super charge and Immediate Service Termination.

In addition to above, there is also a problem when the 3G handset is using a 3G SIM and 3G radio access is applying a 3G authentication (i.e. quintuplet request) at VPMN 106. Even though VPMN 106 opens up its network for 3G access, when HPMN 104 receives a 3G authentication request message from VPMN 106, HPMN 104 responds negatively due to no 3G roaming agreement with VPMN 106. This result in forbidding VPMN 106 (i.e. adding VPMN 106 in forbidden list of networks in the 3G SIM of subscriber 112's handset), thereby restricting subscriber 112's handset from even accessing the 2G part of VPMN 106. This eventually causes the operator of VPMN 106 to lose even its 2G roaming revenue. Moreover, subscriber 112 may also move to another 3G VPMN network that has a 3G roaming agreement with HPMN 104, eventually resulting in loss of subscriber 112 for VPMN 106. It will be apparent to a person skilled in the art that for a 3G SIM, although there is a concept of access technology associated with a preferred network in a preferred PLMN list, there is no such concept for the forbidden list. Thus, in case a network code is forbidden for 3G access technology, the same network code is also forbidden for 2G access. Alternatively, in case different network codes are used at the air interface, then at least the 2G network code will not be forbidden, thereby allowing the operator of VPMN 106 to earn 2G roaming revenue from 3G capable inbound roamers. Earning 2G roaming revenue are rare in such cases, since 3G subscriber 112's handset will first try for alternative 3G network(s), and hence may not give VPMN 106's 2G network any chance.

Figure 7:
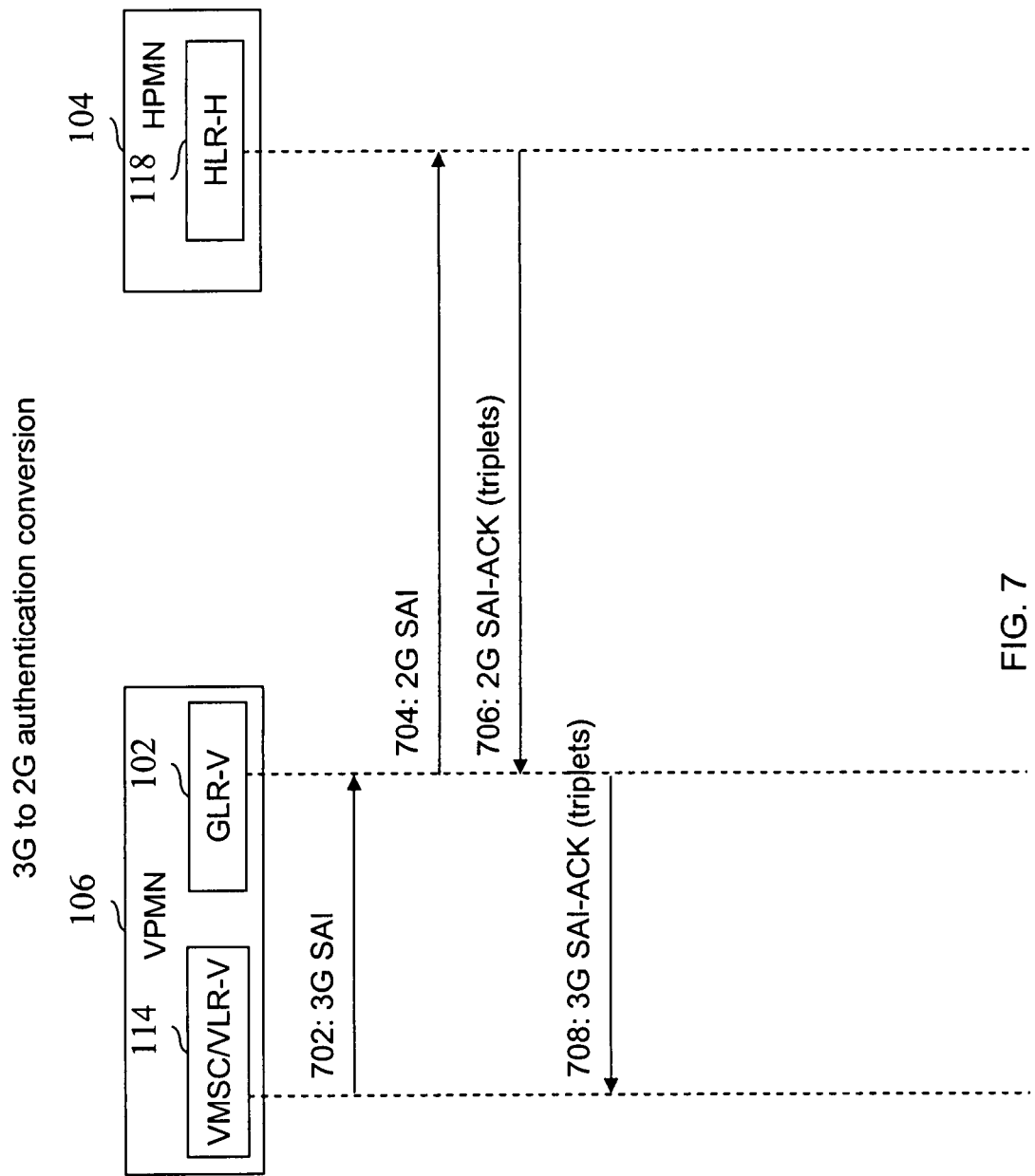
FIG. 7 represents a flow diagram for converting a Third Generation of mobile (3G) authentication message to a Second Generation of mobile (2G) authentication message using the GLR, in accordance with an embodiment of the present invention.

Therefore, in order to solve the above-mentioned problems, the operator of VPMN 106 uses GLR-V 102 to convert a 3G authentication quintuplet request, received from 3G subscriber 112, to a 2G authentication triplet request before sending the authentication request to HPMN 104. FIG. 7 represents a flow diagram for converting 3G authentication message to 2G authentication message when there is no 3G roaming agreement between HPMN 104 and VPMN 106, in accordance with an embodiment of the present invention. Although HPMN 104 and VPMN 106 do not possess 3G roaming agreement, they do have a 2G roaming agreement. At step 702, VMSC/VLR-V 114 sends a 3G authentication request, such as a 3G SAI request message to GLR-V 102 (via STP-V 124), to a SPC of GLR-V 102. It will be apparent to a person skilled in the art that the 3G SAI request message has parameters such as number of vectors required, immediate response indicator, etc., whereas a 2G SAI request message has only an authentication set returned in an acknowledgement message. GLR-V 102 uses this logic to identify the received authentication request as a 3G authentication request message. Now, in order to allow subscriber 112 to authenticate with his HPMN 104, GLR-V 102 converts a 3G SAI request message to a 2G SAI request message, and thereafter GLR-V 102 sends this 2G SAI request message to HLR-H 118, at step 704. This results in faking HLR-H 118 that subscriber 112 is attempting to register at a 2G network, although he, is in fact, attempting to register at a 3G network. Hence at step 706, HLR-H 118 returns authentication triplets in a 2G SAI-ACK message to GLR-V 102, since HPMN 104 has 2G roaming agreement with VPMN 106. Finally, at step 708, GLR-V 102 converts the 2G SAI-ACK message to a 3G SAI-ACK message, and issues the 3G SAI-ACK message with authentication triplets to VMSC/VLR-V 114. It will be apparent to a person skilled in the art that in case subscriber 112 is a UMTS, i.e. 3G subscriber, HLR-H 118 returns authentication quintuplets, whereas in case subscriber 112 is a GSM subscriber, HLR-H 118 returns authentication triplets. Alternatively, in case HLR-H 118 cannot provide VLR-V 114 (or SGSN-V 116) with authentication triplets, an empty response is returned. In such a case, VLR-V 114 (or SGSN-V 116) may then re-use old authentication triplets/quintuplets, except where this is forbidden under the conditions specified in GSM 03.20.

Figure 8:
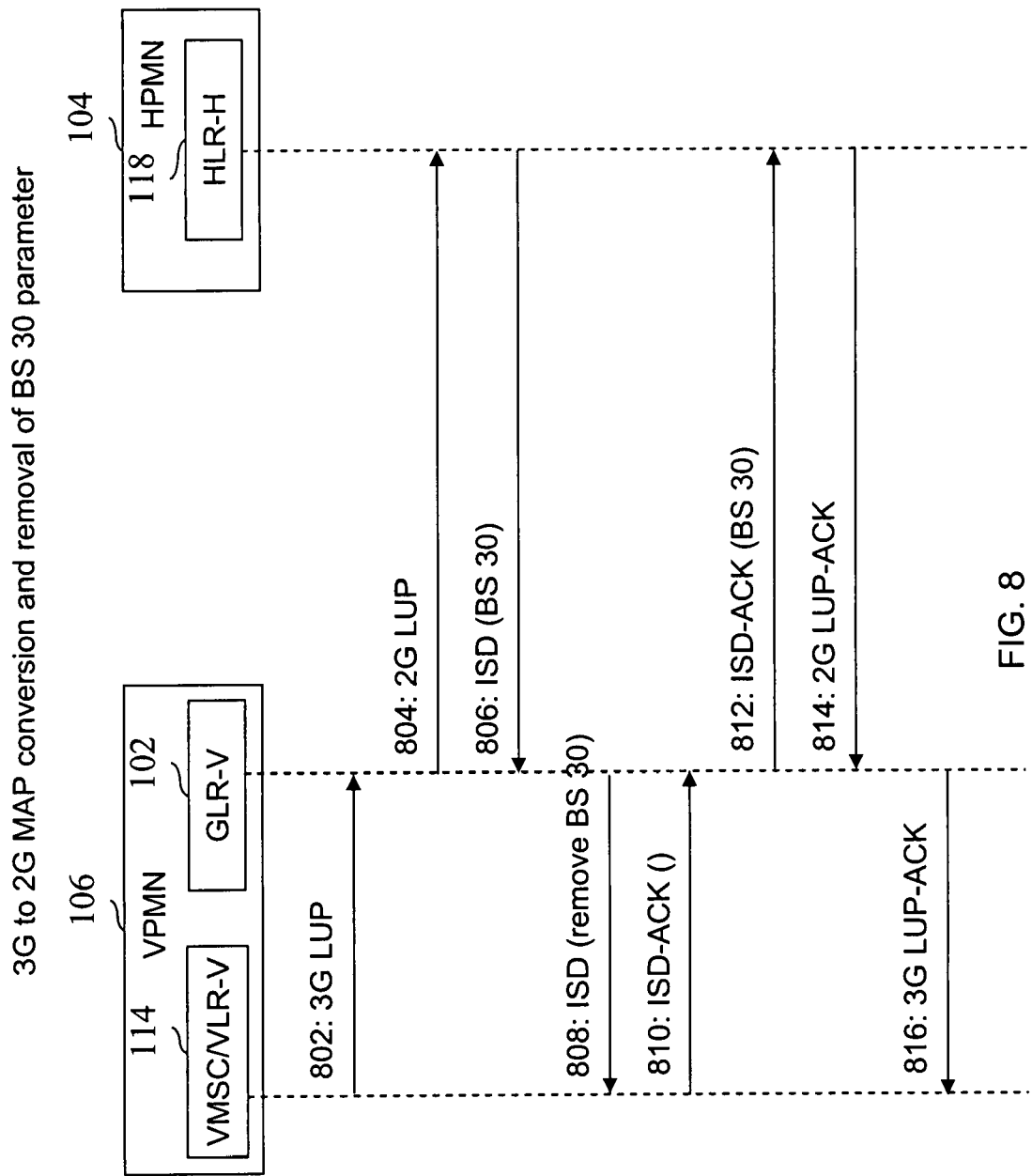
FIG. 8 represents a flow diagram for allowing the subscriber having 3G capabilities to register at the VPMN that has no 3G roaming agreement with the HPMN, in accordance with an embodiment of the present invention.

Similarly, the present invention allow conversion of various other MAP messages, such as, but not limited to, LUP and ISD containing one or more 3G parameters, to respective 2G MAP messages containing 2G parameters. In other words, GLR-V 102 avoids MAP messages with 3G parameters, such as Immediate Service Termination, super charge capability, long FTN support, and Inform Previous Network Entity to be relayed to HPMN 104 so as not to invite a negative response from HPMN 104 that has no 3G roaming agreement with VPMN 106. These MAP messages and SAI messages correspond to a third set of signaling messages, in accordance with an embodiment of the present invention. FIG. 8 represents a flow diagram for allowing subscriber 112 having 3G capabilities to register at VPMN 106, in accordance with an embodiment of the present invention. In this embodiment, 3G subscriber 112 attempts to register at VPMN 106. Thus, at step 802, VMSC/VLR-V 114 sends a 3G LUP message to GLR-V 102. Thereafter, at step 804, GLR-V 102 converts the received 3G LUP message to a 2G LUP message and sends it to HLR-H 118. In an embodiment of the present invention, GLR-V 102 determines the MAP message as a 3G message, based on parameters received in this message and removes these 3G parameters from the MAP message to convert it into a 2G message.

Blocking of 3G Services Using VPMN GLR

In one embodiment of the present invention, VPMN operators may like to block some of the 3G services of its outbound roamers. For example, VPMN 106 may want to block video calling (a 3G service) of subscriber 112, since the operator of VPMN 106 cannot charge for video calls by subscriber 112 in his 2G call tariff plan. In order to deal with such a case, the operator of VPMN 106 uses GLR-V 102 to remove BS 30 parameter. Hence at step 806, when GLR-V 102 receives the BS 30 parameter in an ISD message from HLR-H 118, GLR-V 102 removes the BS 30 parameter and sends the modified ISD message to VMSC/VLR-V 114, at step 808. GLR-V 102 also modifies CgPA to the GLR-V 102 GT (corresponding to VLR-V 114), prior to relaying the ISD message to VMSC/VLR-V 114, in accordance with an embodiment of the present invention. Thereafter, at step 810, VMSC/VLR-V 114 sends an ISD-ACK message to GLR-V 102, which at step 812 relays it to HLR-H 118 with an indication that BS 30 is not supported. Hence incoming video call will not be attempted in HPMN 104. Thereafter, at step 814, HLR-H 118 sends a 2G registration acknowledgment message, such as a 2G LUP-ACK message to GLR-V 102. GLR-V 102 converts the received 2G LUP-ACK message to a 3G LUP-ACK message. Finally, at step 816, GLR-V 102 sends the 3G LUP-ACK message to VMSC/VLR-V 114 indicating successful completion of 3G registration process of subscriber 112 at VPMN 106. Subscriber 112 can thereafter use other 3G capabilities offered by the operator of VPMN 106, while he is roaming in VPMN 106.

Handling of GPRS Authentication and Registration Process

Figure 9A:
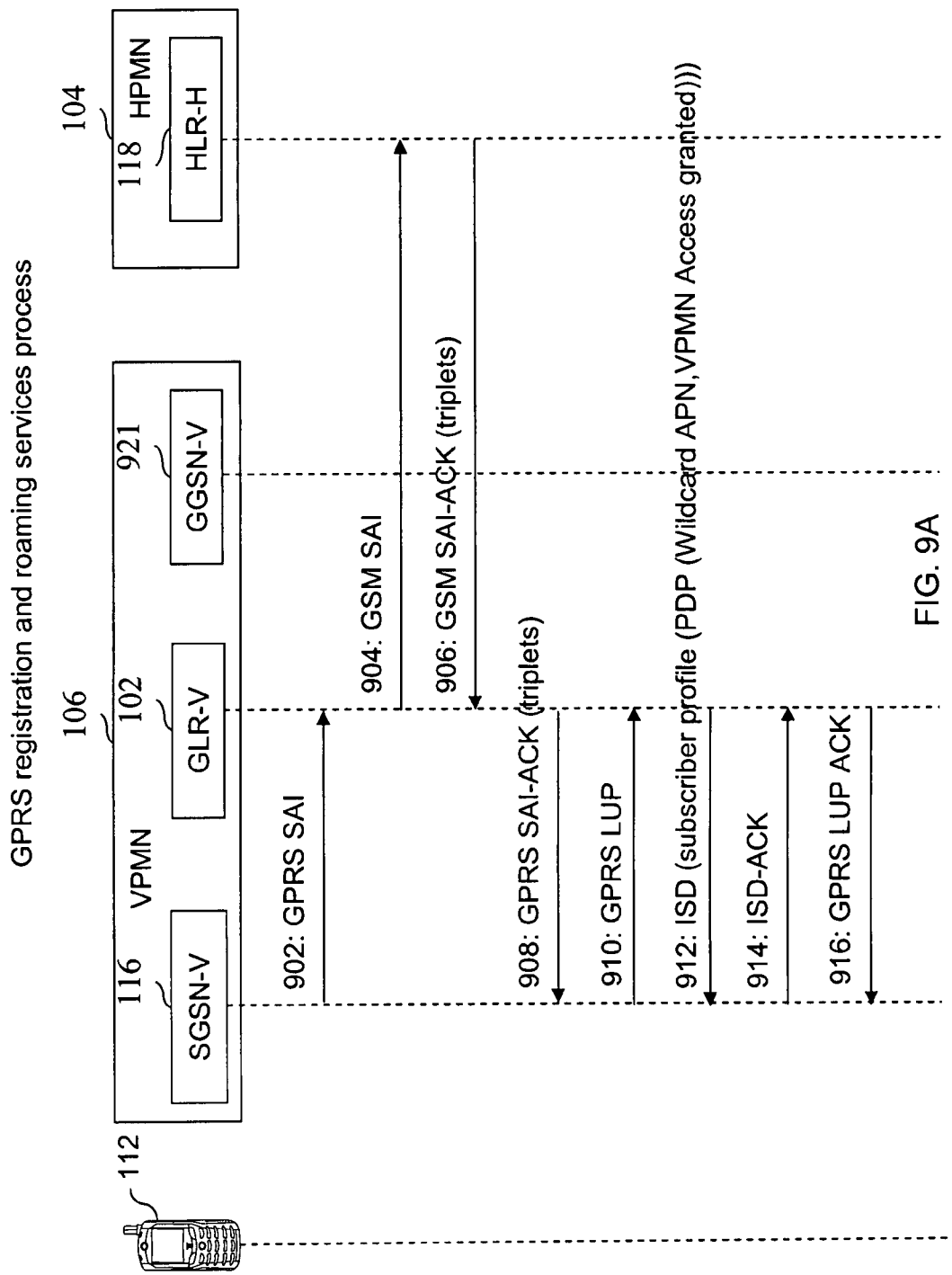
FIGS. 9A and 9B represent a flow diagram for providing GPRS roaming services to the subscriber of the HPMN that has no GPRS roaming agreement with the VPMN, in accordance with an embodiment of the present invention.
Figure 9B:
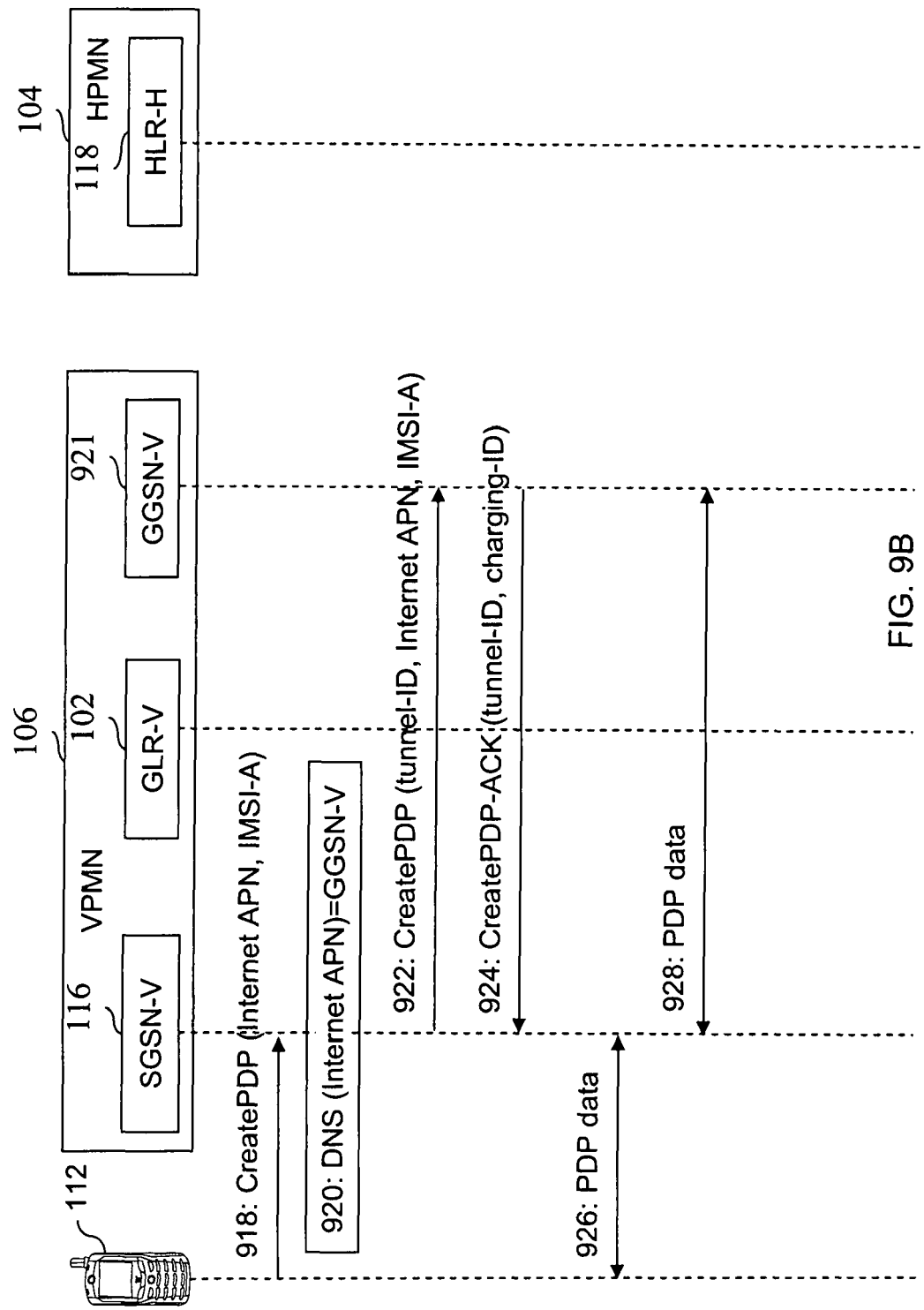

In accordance with an embodiment of the present invention, when subscriber 112 uses GPRS services while roaming in VPMN 106, VMSC/VLR-V 114 is replaced with SGSN-V 116 for handling signaling of subscriber 112. Hence one or more embodiments that are explained above for GSM inbound roamers are also applicable for GPRS inbound roamers. However the method of registration process (including authentication process) and provisioning of GPRS roaming services are different in case subscriber 112 is a GPRS subscriber and HPMN 104 does not possess GPRS roaming agreement with VPMN 106. However in this case, VPMN 106 possesses a GSM roaming agreement with HPMN 104. The present invention allows the operator of VPMN 106 to use GLR-V 102 in order to provide GPRS roaming services to its inbound roamers. FIGS. 9A and 9B represent a flow diagram for providing GPRS roaming services to subscribers of HPMN 104, which has only GSM roaming agreement with VPMN 106, in accordance with an embodiment of the present invention. Subscriber 112 first needs to get authenticated and registered with GPRS support in order to avail GPRS services in VPMN 106. However due to no GPRS roaming agreement, HPMN 104 rejects GPRS related signaling messages (e.g., GPRS SAI, GPRS LUP, etc.) received from VPMN 106. Hence in order to allow GPRS authentication of subscriber 112, GLR-V 102 intercepts a GPRS authentication request from SGSN-V 116, and converts it to a GSM authentication request. At step 902, GLR-V 102 receives the GPRS authentication request, such as GPRS SAI from SGSN-V 116. GSM and GPRS authentication requests are essentially the same, except that GLR-V 102 uses a GLR-V 102 GT corresponding to SGSN-V 116 in case of GPRS (instead of using GLR-V 102 GT corresponding to VLR-V 114 in case of GSM), in accordance with an embodiment of the present invention.

At step 904, GLR-V 102 converts the GPRS SAI to a GSM SAI message, and sends this GSM SAI message to HLR-H 118. HLR-H 118 interprets that subscriber 112 is attempting to register with GSM support at VPMN 106, and hence replies with authentication triplets in a GSM SAI-ACK message to GLR-V 102, at step 906. Thereafter, at step 908, GLR-V 102 again converts the GSM SAI-ACK message to a GPRS SAI-ACK message, and sends this GPRS message with authentication triplets to SGSN-V 116. This allows the operator of VPMN 106 to authenticate GPRS enabled subscriber 112 with his HPMN 104. Now, the operator of VPMN 106 needs to facilitate GPRS registration of subscriber 112 at VPMN 106. Therefore, at step 910, SGSN-V 116 issues a GPRS LUP message to GLR-V 102, which imitates support for GPRS profile exchange with SGSN-V 116. This requires the operator of VPMN 106 to configure GLR-V 102 (i.e., to grant GPRS access to subscriber 112 and provide a wildcard Access Point Name (APN) for subscriber 112's IMSI-A along with subscriber profile information in an update message to SGSN-V 116. Thus, at step 912, GLR-V 102 returns the subscriber profile information, wildcard APN, and VPMN access granted indication in an ISD message to SGSN-V 116. Thereafter, at step 914, SGSN-V 116 issues an ISD-ACK message to GLR-V 102, which then sends a GPRS LUP-ACK message to SGSN-V 116 indicating successful completion of subscriber 112's GPRS registration at VPMN 106, at step 916.

The above mentioned mechanism for GPRS registration process is also useful to imitate GPRS roaming support of some 2G GSM roamers whose handsets (generally data centric devices) first search for a GPRS network to register, before attempting any GSM registration. For example, some blackberry handsets usually first search for networks that have both GPRS and GSM support. Also, nowadays there are many data capable devices that set (usually default setting) packet data networks (i.e. GPRS) as preferred networks over circuit switched networks (i.e. GSM). Similar to the 3G problem mentioned above (i.e., in FIG. 7 and FIG. 8), without emulating GPRS roaming support of subscriber 112 at VPMN 106, subscriber 112 would end up registering with a competitor network, thereby resulting in loss of 2G GSM roaming revenue to the operator of VPMN 106. By emulating the GPRS roaming support in VPMN 106, such GPRS preferred devices can be retained at VPMN 106. In an embodiment of the present invention, the operator of VPMN 106 charges subscribers having these GPRS preferred devices using either a prepaid SCP (not illustrated in FIGS. 9A and 9B) or a 2G circuit based tariff (i.e. data and voice tariffs), which is charged based on duration of usages of GPRS services. Moreover, even in some cases where the operator of VPMN 106 is unable to provide the GPRS roaming services (e.g., to non-internet enterprise based blackberry subscribers whose emails really depend upon an HPMN security connection to an enterprise email service), VPMN 106 may still like to retain its inbound roamers for voice and SMS services, thereby earning roaming revenue from the voice and SMS services offered.

Providing GPRS Services to Inbound Roamer after his Successful Registration at VPMN Furthermore, if the operator of VPMN 106 wishes to provide GPRS internet services, the GPRS registered subscriber 112 needs to initiate a browser session using an internet APN in his handset. Hence at step 918, subscriber 112's handset sends a CreatePDP message on the IMSI-A along with the internet APN to SGSN-V 116. Thereafter, SGSN-V 116 maps the internet APN to the wildcard APN (received at step 912) in order to grant GPRS access to subscriber 112. It will be apparent to a person skilled in the art that since HPMN 104 does not have GPRS roaming agreement with VPMN 106, in case SGSN-V 116 sends a GPRS related message to GGSN-H 120, GGSN-H 120 will discard this message (or send a negative acknowledgement to SGSN-V 116). Additionally, at step 920, SGSN-V 116 modifies Domain Name Servers (DNS) on the internet APN to point to a GGSN-V 921, in order to grant GPRS internet access to subscriber 112. Alternatively, when SGSN-V 116 checks DNS on an operator name that does not have a GPRS roaming agreement with VPMN 106, SGSN-V 116 maps the internet APN to a local GGSN associated with VPMN 106. Thereafter, at step 922, SGSN-V 116 sends the CreatePDP message on the IMSI-A along with a tunnel-ID and the internet APN to GGSN-V 921. At step 924, GGSN-V 921 returns a CreatePDP-ACK message with the tunnel-ID and a charging-ID to SGSN-V 116, indicating that PDP context can be established. Subsequently, SGSN-V 116 exchanges PDP data with subscriber 112's handset, at step 926. Thereafter, at step 928, SGSN-V 116 and GGSN-V 921 also exchanges PDP data. In an embodiment of the present invention, this PDP establishment allows subscriber 112 to use GPRS roaming services at local charges applicable in VPMN 106.

Detecting Competitor VPMN GLR

Furthermore, the operator of VPMN 106 may want to optimize steering of its inbound roamers' roaming traffic, based on the knowledge that a competitor VPMN is also performing steering. This can be achieved by using GLR-V 102 (with any monitoring mechanism, active or passive), to detect whether the competitor VPMN is deploying an add-on SS7 node. This add-on SS7 node corresponds to a new GLR module deployed at the competitor VPMN, in accordance with an embodiment of the present invention. Alternatively, it may be any other component in the competitor VPMN that is attempting to redirect roamers to its own network. In case the new GLR module is using a single GT in all LUP transactions by subscribers of HPMN 104 at the competitor VPMN, then GLR-V 102 sends one or more routing information query messages, such as SRI-SM query messages for a pre-defined interval to HPMN 104 of these departing subscribers (who have departed to the competitor VPMN from VPMN 106). This helps VPMN 106 operator to suspect presence of the new GLR module in the competitor VPMN. GLR-V 102 confirms presence of the new GLR module upon receipt of an identical VMSC address (which always indicate the same GT for the competitor VPMN) from HPMN 104 in all SRI-SM-ACK messages (correspond to acknowledgements to all SRI-SM query messages).

Similarly, in case the competitor VPMN's GLR module is using multiple GTs (for example, original VLR GTs), then for VPMN 106 to detect whether the competitor VPMN is using the new GLR module, GLR-V 102 can periodically issue one or more SRI-SM query messages to HPMN 104 for each departing inbound roamer from HPMN 104. In case the VMSC address returned in all SRI-SM-ACK messages from HPMN 104 statistically indicates the same GT for the competitor VPMN, the presence of the competitor VPMN's GLR module is confirmed.

In another embodiment of the present invention, subscriber 112 moves from a VLR-X in the competitor VPMN to a new VPMN 'Z'. After certain time duration, he registers back at a different VLR location (e.g., a VLR-Y) in the competitor VPMN. In this case, GLR-V 102 uses this small period of switching of networks to detect the presence of the competitor VPMN's GLR module. The presence is detected by determining whether the VMSC address returned in all SRI-SM-ACK messages from HPMN 104 indicates the same GT for the competitor VPMN, till subscriber 112 remains with the competitor operator.

Sharing VPMN GLR Between Different VPMN Operators

In another embodiment of the present invention, VPMN 106 operator may also want to share GLR-V 102 with some other VPMN operators, in order to bring down the cost of deploying and maintaining respective GLRs in each of the respective VPMN operators' network. Another reason could be that sharing VPMN operators may want to provide inbound roaming services to their inbound roamers, even when some (or all) of these VPMN operators do not possess roaming agreement with HPMN operator of these inbound roamers. This will be described later in the context of the present invention. In an embodiment of the present invention, the shared GLR is assigned a GT for each VLR (and SGSN) per partner VPMN. In an embodiment of the present invention, the shared GLR is centrally deployed at VPMN 106 (i.e. acts as GLR-V 102). In another embodiment of the present invention, the shared GLR is deployed at any of the partner VPMNs. In yet another embodiment of the present invention, an international SS7 carrier or a common carrier deploys the shared GLR at a common hosting location for partner VPMNs. Various embodiments of the present invention, described hereinafter for shared GLR, assume that the shared GLR is deployed in VPMN 106 as GLR-V 102. In addition, GLR-V 102 is defined per partner VPMN, in accordance with an embodiment of the present invention. This means that various application logic, applied by plug-in module 308 that were earlier defined for all inbound roamers in VPMN 106, will now be defined for each partner VPMN. Also, each partner VPMN configures and defines one or more signaling messages that are defined per HPMN and are handled by GLR-V 102. Similarly, each partner VPMN control various CAMEL services that are defined for one or more inbound roamers.

In a first embodiment of the present invention, each partner VPMN has a GMSC associated with its network. These GMSCs are hereinafter interchangeably referred to as one or more gateway switching centers. The GMSCs communicate with GLR-V 102 via a leased line connection (or any other dedicated connection). The leased line connection is required to avoid GT routing and use of prepaid STP (both of which otherwise would have been applicable), for routing all signaling messages, in addition to providing secured exchange of all signaling messages. In a second embodiment of the present invention, each partner VPMN deploys an add-on SS7 node in its network. These nodes communicate with GLR-V 102 by exchanging all SCCP signaling messages, using an encapsulation/de-capsulation technique. Hence each partner VPMN deploys an SS7 node in order to exchange encapsulated SCCP messages with centrally deployed GLR-V 102. Now, upon receiving SCCP messages from partner VPMNs, GLR-V 102 needs to de-capsulate such messages before processing any further. This technique of encapsulation of SCCP messages by partner VPMNs and then de-capsulation of such messages by GLR-V 102 is referred to as encapsulation/de-capsulation technique. It will be apparent to a person skilled in the art the second embodiment does not require any leased line connection.

Furthermore, in a third embodiment of the present invention, each partner VPMN has a roaming STP associated with its network. For example, STP-V 124 is the roaming STP in VPMN 106. These one or more roaming STPs communicate with GLR-V 102, as they are configured to redirect all signaling messages of all inbound roamers, destined for any HPMN (i.e. from one or more HPMNs), to an international SPC associated with GLR-V 102. This embodiment does not require any leased line or add-on SS7 nodes in any partner VPMN. Alternatively, in a fourth embodiment of the present invention, the roaming STPs communicate with GLR-V 102 by exchanging all signaling messages over an IP network, when GLR-V 102 supports a Stream Control Transmission Protocol (SCTP) and an MTP2 User Peer-to-peer Adaptation Layer (M2PA) protocol. This embodiment also requires each of these roaming STPs to support a Signaling Transport (SIGTRAN), the SCTP and the M2PA protocols.

In accordance with a fifth embodiment of the present invention, these roaming STPs communicate with GLR-V 102, using a prefix GT approach. This is achieved by configuring each of these roaming STPs to redirect all signaling messages with a pre-defined prefixed GT (configured by each partner VPMN) to GLR-V 102. In other words, the roaming STPs add the pre-defined prefix to a GT of an original CdPA. The original CdPA in such case corresponds to an address of HPMN 104. Usually, the standard limit for the length of the SCCP CdPA is limited to 15 digits. Although the length may be extended to 18 digits, some SCCP carriers follow the standard limit length of the SCCP CdPA. In order to overcome the problem of limited number of digits for the SCCP CdPA, partner VPMNs may use an alias GT approach, where each partner VPMN configure its respective STP to replace a first GT (corresponding to the GT of the original CdPA) with a second GT that corresponds to GLR-V 102. This allows redirecting all signaling messages with the second GT to GLR-V 102. This technique is based on one-to-one correspondence where each roaming STP communicates with GLR-V 102.

In another embodiment of the present invention, the shared GLR is allocated a GT of a VPMN that is elected to represent the group of partner VPMNs, when an inbound roamer registers with any partner VPMN of this group. The elected VPMN corresponds to a sponsor VPMN that has a roaming agreement with HPMN 104, whereas other partner VPMNs function as sponsored VPMNs, which piggyback on roaming relationships of the sponsor VPMN for routing their signaling messages to HPMN 104. Hence these partner VPMNs communicate with HPMN 104 via the shared GLR, without following the complex route of having bilateral roaming agreements with each of the roaming partners of the sponsor VPMN. This sponsor VPMN may either be from the group of partner VPMNs, or a new VPMN that is not a part of the group of partner VPMNs. In the sponsor VPMN case, HPMN 104 always perceives as if the inbound roamer is registered at the sponsor VPMN, irrespective of its actual registration location. In an embodiment of the present invention, when subscriber 112 attempts to register at a VPMN 'X' (which piggybacks on roaming relationship of sponsor VPMN 106) using the IMSI-A of VPMN 106, a LUP message from a VMSC/VLR-V1 associated with the VPMN 'X' is relayed to HLR-H 118 via GLR-V 102 in VPMN 106. Since, the received LUP message contains the IMSI-A of VPMN 106 that has a roaming agreement with HPMN 104; HLR-H 118 allows subscriber 112 to register at VPMN 'X' even when the VPMN 'X' does not have roaming agreement with HPMN 104.

In addition, the shared GLR (or GLR-V 102) described above can also work as an integrated function within an STP (national or international), or as an independent SS7 node. It will be apparent to a person skilled in the art that roaming services can be provided to all inbound roamers using other technologies such as, but not limited to, VoIP, WiFi, 2G, 3G, and inter-standard roaming. For example, a 3G roaming subscriber traveling to a VPMN may like to avail roaming services similar to the ones he receives in his HPMN. To support these variations, GLR-V 102 will have a separate SS7 and network interfaces, corresponding to both the VPMN and HPMN networks. It will also be apparent to a person skilled in the art that these two interfaces in different directions may not have to be the same technologies. In addition, there could be multiple types of interfaces in both directions.

A VPMN operator uses one or more embodiments of the present invention to provide roaming services to inbound roamers from any HPMN, while they are registered with the VPMN. The overall cost associated with deploying an enhanced functionality GLR is less; moreover, the GLR can provide various VASs to its inbound roamers. This also allows the VPMN operator to entice more inbound roamers to register in its network coverage. Also, reduction in the cost of deploying and maintaining additional SS7 nodes to the existing network eventually maximizes roaming revenues for the VPMN operator. Furthermore, the VPMN operator is able to adjust its roaming traffic of inbound roamers across various VPMNs. Moreover, various VPMN operators can also share the GLR making the deployment even more cost effective, since a single node is able to serve a number of operators, allowing them to increase their roaming revenues. The present invention also ensures that VPMN operator's roaming traffic is not affected in case GLR goes down, hence ensuring no loss of roaming revenue to VPMN operator. Furthermore, the VPMN operator allows an inbound roamer, associated with an HPMN, having 3G/GPRS capabilities to roam in its network, even when the VPMN does not possess any 3G/GPRS roaming agreement with the HPMN.

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the present invention.

Furthermore, the present invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

A computer usable medium provided herein includes a computer usable program code, which when executed, provides providing roaming services to one or more inbound roaming subscribers in a VPMN, where the subscribers are correspondingly associated with one or more HPMNs. The computer program product further includes a computer usable program code for allocating a pool of GTs to a GLR (in the VPMN) where the pool of GTs corresponds to at least one of: one or more VLRs associated with the VPMN, one or more SGSNs associated with the VPMN, the one or more HPMNs, and one or more HLRs associated with an HPMN from the one or more HPMNs. The computer program product further includes a computer usable program code for facilitating mobile communication of the inbound roaming subscribers in the VPMN, while the subscribers are registered with the VPMN.

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the present invention, are detailed illustrations of a scheme for providing roaming services to inbound roaming subscribers of a VPMN. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However use of these examples should not be interpreted as limiting the present invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
| --- | --- |
| 3G | Third Generation of mobile |
| 3GPP | Third Generation Partnership Project |
| APN | Access Point Name |
| APN-H | HPMN APN |
| APN-V | VPMN APN |
| ATI | Any Time Interrogation |
| ATSI | Anytime Subscription Information |
| CAMEL | Customized Application for Mobile Enhanced Logic |
| CAP | Camel Application Part |
| CB | Call Barring |
| CdPA | Called Party Address |
| CgPA | Calling Party Address |
| CSI | Camel Subscription Information |
| DNS | Domain Name Server |
| FTN | Forward-To Number |
| GGSN | Gateway GPRS Support Node |
| GGSN-H | GGSN in HPMN |
| GGSN-V | GGSN in VPMN |
| GLR | Gateway Location Register |
| GMLC | Gateway Mobile Location Centre |
| GMSC | Gateway MSC |
| GMSC-H | GMSC in HPMN |

APPENDIX-continued

| Acronym | Description |
| --- | --- |
| GMSC-V | GMSC in VPMN |
| GPRS | General Packet Radio System |
| GSM | Global System for Mobile |
| GT | Global Title |
| GTP | GPRS Tunneling Protocol |
| HLR | Home Location Register |
| HLR-H | HPMN HLR |
| HPMN | Home Public Mobile Network |
| IDP | Initial Detection Point IN/CAP message |
| IM-GSN | Intermediate GSN |
| IM-MSC | Intermediate Mobile Switching Center |
| IMSI | International Mobile Subscriber Identity |
| IP | Internet Protocol |
| ISD | MAP Insert Subscriber Data |
| ISTP | International STP |
| ISTP-V | ISTP connected to VPMN STP |
| ISTP-H | ISTP connected to HPMN STP |
| ITR | Inbound Traffic Redirection |
| LCS | Location Service |
| LUP | MAP Location Update |
| M2PA | MTP2 User Peer-to-peer Adaptation Layer |
| MAP | Mobile Application Part |
| MD | Missing Data |
| MGT | Mobile Global Title |
| MO | Mobile Originated |
| MIMM | Multiple IMSI Multiple MSISDN |
| MSC | Mobile Switching Center |
| MSISDN | Mobile Station International Subscriber Directory Number |
| MSRN | Mobile Station Roaming Number |
| MT | Mobile Terminated |
| O-CSI | Originating CAMEL Subscription Information |
| ODB | Operator Determined Barring |
| PDF | Packet Data Protocol |
| PRN | MAP Provide Roaming Number |
| PSL | Provide Subscriber Location |
| PSI | MAP Provide Subscriber Information |
| RNA | Roaming Not Allowed |
| RRDuF | Roaming Restricted Due to unsupported Feature |
| SAI | Send Authentication Information |
| SCCP | Signaling Connection Control part |
| SCP | Signaling Control Point |
| SCTP | Stream Control Transmission Protocol |
| SF | System Failure |
| SG | Signaling Gateway |
| SGSN | Serving GPRS Support Node |
| SGSN-H | HPMN SGSN |
| SGSN-V | VPMN SGSN |
| SIGTRAN | Signaling Transport |
| SIM | Subscriber Identity Module |
| SMS | Short Message Service |
| SMS-GMSC | Short Message Service GMSC |
| SMSC | Short Message Service Center |
| SIMM | Single IMSI Multiple MSISDN |
| SPC | Signal Point Code |
| SRI | MAP Send Routing Information |
| SRI-LCS | MAP Send Routing Information for LoCation Service |
| SRI-SM | MAP Send Routing Information for Short Message |
| SRI-GPRS | MAP Send Routing Information for GPRS |
| SS | Supplementary Services |
| SS7 | Signaling System #7 |
| SSN | Sub System Number |
| STP | Signal Transfer Point |
| STP-V | VPMN STP |
| STP-H | HPMN STP |
| TCAP | Transaction Capabilities Application Part |
| T-CSI | Terminating CAMEL Service Information |
| TR | Traffic Redirection |
| UMTS | Universal Mobile Telecommunications System |
| UDV | Unexpected Data Value |
| VAS | Value Added Service |
| VHE | Virtual Home Environment |
| VLR | Visited Location Register |
| VLR-V | VPMN VLR |
| VMSC | Visited Mobile Switching Center |
| VMSC-V | VPMN VMSC |
| VPMN | Visited Public Mobile Network |

Technical References (the Entirety of Each of which is Incorporated by Reference Herein)
GSM 902 on MAP specification
Digital cellular telecommunications system (Phase 2+) Mobile Application Part (MAP) Specification (3GPP TS 09.02 version 7.9.0 Release 1998)
GSM 340 on SMS
Digital cellular telecommunications system (Phase 2+) Technical realization of the Short Message Service (SMS) (GSM 03.40 version 7.4.0 Release 1998)
GSM 23.119 Gateway Location Register (GLR)
GSM 23.120 MAP specification for GLR
GSM 320 Security related network functions
GSM 360 on GPRS
GSM 23.060 on GPRS R99
GSM 960 on GPRS GTP 0
GSM 29.060 on GPRS GTP 1
GSM 378 on CAMEL,
GSM 978 on CAMEL Application Protocol,
GSM 379 on CAMEL Support of Optimal Routing (SOR),
GSM 318 on CAMEL Basic Call Handling
ITU-T Recommendation Q.1214 (1995), Distributed functional plane for intelligent network CS-1,
ITU-T Recommendation Q.1218 (1995), Interface Recommendation for intelligent network CS-1,
ITU-T Recommendation Q.762 (1999), Signaling system No. 7—ISDN user part general functions of messages and signals,
ITU-T Recommendation Q.763 (1999), Signaling system No. 7—ISDN user part formats and codes,
ITU-T Recommendation Q.764 (1999), Signaling system No. 7—ISDN user part signaling procedures,
ITU-T Recommendation Q.765 (1998), Signaling system No. 7—Application transport mechanism,
ITU-T Recommendation Q.766 (1993), Performance objectives in the integrated services digital network application,
ITU-T Recommendation Q.769.1 (1999), Signaling system No. 7—ISDN user part enhancements for the support of Number Portability

I claim:

1. A computer-assisted method for providing roaming services to one or more subscribers associated with a Home Public Mobile Network (HPMN), the computer comprising a processor, the one or more subscribers being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the method comprising:
    allocating a pool of Global Titles (GTs), the pool of GTs including a plurality of GTs, to the GLR, the pool of GTs corresponding to at least one selected from the group consisting of one or more of the VLRs, one or more of the SGSNs, one or more of the HPMNs, and one or more of the HLRs; and
    facilitating, via the GLR, a mobile communication of the one or more subscribers;
    wherein more than one selected from the plurality of GTs from the pool of GTs is allocated to the GLR;
    wherein the GLR communicates with each one of the one or more VLRs via a different one selected from the plurality of the GTs in the pool;
    wherein the GLR is coupled to a plug-in module that facilitates exchange of signaling messages between the GLR and the HPMN, and between the GLR and the VPMN, by applying application logic, via the processor, to the signaling messages; and
    wherein applying the application logic includes one selected from a group consisting of: modifying an update message to send a VPMN Mobile Station International Subscriber Directory Number (MSISDN), instead of an HPMN MSISDN to the VPMN; modifying a signaling message to send an HPMN International Mobile Subscriber Identity (IMSI), instead of a VPMN IMSI to the HPMN; modifying a call barring parameter from the update message prior to sending the update message to the VPMN; sending a modified Forward-To Number (FTN) associated with the HPMN in the update message to the VPMN to control late call forwarding; caching profile information of the one or more subscribers based on pre-defined criteria to control distribution of the one or more subscribers' roaming traffic in a visiting country of the one or more subscribers; detecting a Steering of Roaming (SoR) attempt from the HPMN; thwarting at least one of the SoR attempt from the HPMN and an inbound SoR attempt by a competitor VPMN, by sending a first set of signaling messages to the HPMN when one of the one or more subscribers attempts to register at the VPMN; retaining the one of the one or more subscribers at the VPMN despite the attempt of the subscriber to register at the competitor VPMN, by sending a second set of signaling messages to the HPMN; restoring the mobile communication of the one of the one or more subscribers upon detecting the handset of the one of the one or more subscribers getting stuck in the VPMN due to an incomplete registration process; and creating CAMEL Subscription Information (CSI) for the one or more subscribers by responding to one selected from a group consisting of: a registration message from the VPMN with nested update messages containing the CSI, and a registration response message from the VPMN with a standalone update message containing the CSI.

2. The method of claim 1,
    wherein the GLR is coupled to a module selected from a group consisting of a configurable module and a roaming Signaling System #7 (SS7) node, the selected module configured to respond to selected signaling messages, intended for the HPMN and originating from the VPMN so as to facilitate the mobile communication of a subscriber associated with the HPMN; and
    wherein the roaming SS7 node stores profile information of the one or more subscribers via one selected from a group consisting of: monitoring roaming links between the VPMN and the one or more HPMN to retrieve the profile information, and directly retrieving the profile information from the GLR.

3. The method of claim 1, wherein:
    the GLR is coupled to a module selected from a group consisting of a configurable module and a roaming Signaling System #7 (SS7) node, the selected module configured to respond to selected signaling messages, intended for the HPMN and originating from the VPMN so as to facilitate the mobile communication of a subscriber associated with the HPMN; and wherein
    the selected signaling messages corresponds to one selected from a group consisting of a Mobile Application Part (MAP) Send Routing Information (SRI), a MAP Send Routing Information For Short Message (SRI-SM), a MAP Send Routing Information for GPRS (SRI-GPRS), a MAP Send Routing Information For Location Service (SRI-LCS), a MAP Any Time Interrogation (ATI), and a MAP Any Time Subscription Interrogation (ATSI).

4. A computer-assisted method for providing roaming services to one or more subscribers associated with a Home Public Mobile Network (HPMN), the computer comprising a processor, the one or more subscribers being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the method comprising:
  allocating a pool of Global Titles (GTs), the pool of GTs including a plurality of GTs, to the GLR, the pool of GTs corresponding to at least one selected from the group consisting of one or more of the VLRs, one or more of the SGSNs, one or more of the HPMNs, and one or more of the HLRs; and
  facilitating, via the GLR, a mobile communication of the one or more subscribers;
  wherein more than one selected from the plurality of GTs from the pool of GTs is allocated to the GLR;
  wherein the GLR communicates with each one of the one or more VLRs via a different one selected from the plurality of the GTs in the pool, the VPMN having no roaming agreement with the HPMN;
  wherein a set of signaling messages is exchanged, via the processor, between the HPMN and the VPMN; and
  wherein the GLR modifies the set of signaling messages by removing one or more 3G parameters from the set.

5. A computer-assisted method for providing roaming services to one or more subscribers associated with a Home Public Mobile Network (HPMN), the computer providing a processor, the one or more subscribers being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the method comprising:
  allocating a pool of Global Titles (GTs), the pool of GTs including a plurality of GTs, to the GLR, the pool of GTs corresponding to at least one selected from the group consisting of one or more of the VLRs, one or more of the SGSNs, one or more of the HPMNs, and one or more of the HLRs; and
  facilitating, via the GLR, a mobile communication of the one or more subscribers;
  wherein more than one selected from the plurality of GTs from the pool of GTs is allocated to the GLR; and
  wherein the GLR communicates with each one of the one or more VLRs via a different one selected from the plurality of the GTs in the pool, the VPMN having a competitor VPMN and a Visited Mobile Switching Center (VMSC), the VMSC having an address, a plurality of the one or more subscribers being initially registered with the VPMN, wherein the GLR determines that the competitor VPMN is deploying an add-on SS7 node by:
    sending, for a pre-defined interval, one or more routing information query messages corresponding to a plurality of the one or more subscribers, to the HPMN, upon a determination that the plurality of the one or more subscribers are registered with the competitor VPMN; and
    detecting, via the processor, a presence of the add-on SS7 node upon a receipt of an identical VMSC address in acknowledgements to routing information query messages.

6. A system for providing roaming services to a subscriber of a Home Public Mobile Network (HPMN), the subscriber being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the system comprising:
  a processor;
  an allocator for allocating a pool of Global Titles (GTs), the pool of GTs including a plurality of GTs, to the GLR, the pool of GTs corresponding to one selected from a group consisting of the one or more VLRs, the one or more SGSNs, the one or more HPMNs, and the one or more; and
  a facilitator for facilitating, via the GLR, a mobile communication of the subscriber;
  wherein more than one GT selected from the plurality of GTs is allocated to the GLR;
  wherein the GLR communicates with each one of the one or more VLRs via a different one from the selected one of the plurality of GTs in the pool;
  wherein the GLR shares the pool of GTs with at least one partner VPMN of the VPMN, the at least one partner VPMN having an associated roaming STP, the GLR having an associated international Signal Point Code (SPC); and
  wherein the roaming STP communicates with the GLR by redirecting signaling messages corresponding to the subscriber destined for the HPMN, to the international SPC.

7. A system for providing roaming services to a subscriber of a Home Public Mobile Network (HPMN), the subscriber being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the system comprising:
  a processor;
  an allocator for allocating a pool of Global Titles (GTs), the pool of GTs including a plurality of GTs, to the GLR, the pool of GTs corresponding to one selected from a group consisting of the one or more VLRs, the one or more SGSNs, the one or more HPMNs, and the one or more; and
  a facilitator for facilitating, via the GLR, a mobile communication of the subscriber;
  wherein more than one GT selected from the plurality of GTs is allocated to the GLR;
  wherein the GLR communicates with each one of the one or more VLRs via a different one from the selected one of the plurality of GTs in the pool; and
  wherein the GLR shares the pool of GTs with at least one partner VPMN of the VPMN, the at least one partner VPMN having an associated roaming STP, the GLR supporting a Stream Control Transmission Protocol (SCTP) and an MTP2 User Peer-to-peer Adaptation Layer (M2PA) protocol, each roaming STP support a Signaling Transport (SIGTRAN), the SCTP and the M2PA protocols wherein one or more of the roaming STPs communicate with the GLR by exchanging signaling messages over an Internet Protocol (IP) network.

8. A system for providing roaming services to a subscriber of a Home Public Mobile Network (HPMN), the subscriber being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the system comprising:

a processor;

an allocator for allocating a pool of Global Titles (GTs), the pool of GTs including a plurality of GTs, to the GLR, the pool of GTs corresponding to one selected from a group consisting of the one or more VLRs, the one or more SGSNs, the one or more HPMNs, and the one or more; and a facilitator for facilitating, via the GLR, a mobile communication of the subscriber;

wherein more than one GT selected from the plurality of GTs is allocated to the GLR;

wherein the GLR communicates with each one of the one or more VLRs via a different one from the selected one of the plurality of GTs in the pool; and wherein the GLR shares the pool of GTs with at least one partner VPMN of the VPMN, the at least one partner VPMN having an associated roaming STP, the GLR having a pre-defined prefix, the HPMN being an original Called Party Address (CdPA) having an associated GT, wherein the roaming STP communicates with the GLR by configuring the roaming STP to add the pre-defined prefix to the GT of the original CdPA, so as to redirect signaling messages with the prefixed GT to the GLR.

9. A system for providing roaming services to a subscriber of a Home Public Mobile Network (HPMN), the subscriber being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the system comprising:

a processor;

an allocator for allocating a pool of Global Titles (GTs), the pool of GTs including a plurality of GTs, to the GLR, the pool of GTs corresponding to one selected from a group consisting of the one or more VLRs, the one or more SGSNs, the one or more HPMNs, and the one or more; and a facilitator for facilitating, via the GLR, a mobile communication of the subscriber;

wherein more than one GT selected from the plurality of GTs is allocated to the GLR;

wherein the GLR communicates with each one of the one or more VLRs via a different one from the selected one of the plurality of GTs in the pool; and wherein the GLR shares the pool of GTs with at least one partner VPMN of the VPMN, the at least one partner VPMN having an associated roaming STP, the HPMN being an original Called Party Address (CdPA) having an associated first GT, the GLR having an associated second GT, wherein the roaming STP communicates with the GLR by configuring the roaming STP to replace the first GT with the second GT, so as to redirect signaling messages with the second GT to the GLR.

10. A system for providing roaming services to a subscriber of a Home Public Mobile Network (HPMN), the subscriber being registered with a Visited Public Mobile Network (VPMN), the HPMN having one or more Home Location Registers (HLRs), the VPMN having one or more associated Serving General Packet Radio System (GPRS) Support Nodes (SGSNs), one or more associated Visited Location Registers (VLRs) and an associated Gateway Location Register (GLR), the system comprising:

a processor;

an allocator for allocating a pool of Global Titles (GTs), the pool of GTs including a plurality of GTs, to the GLR, the pool of GTs corresponding to one selected from a group consisting of the one or more VLRs, the one or more SGSNs, the one or more HPMNs, and the one or more; and a facilitator for facilitating, via the GLR, a mobile communication of the subscriber;

wherein more than one GT selected from the plurality of GTs is allocated to the GLR;

wherein the GLR communicates with each one of the one or more VLRs via a different one from the selected one of the plurality of GTs in the pool;

wherein the GLR shares the pool of GTs with at least one partner VPMN of the VPMN;

wherein one of the at least one partner VPMN is a sponsor VPMN, the sponsor VPMN having a GT and a roaming agreement with the HPMN; and wherein the GLR is allocated the GT of the sponsor VPMN, so as to allow the at least one partner VPMN to communicate with the HPMN via the GLR.

* * * * *